United States Patent [19]

Hasegawa

[11] 4,454,853
[45] Jun. 19, 1984

[54] ELECTRONIC FUEL INJECTION CONTROL SYSTEM FOR INTERNAL COMBUSTION ENGINES HAVING EXHAUST GAS RECIRCULATION DEVICES

[75] Inventor: Shumpei Hasegawa, Niiza, Japan

[73] Assignee: Honda Motor Co., Ltd., Tokyo, Japan

[21] Appl. No.: 443,563

[22] Filed: Nov. 22, 1982

[30] Foreign Application Priority Data

Nov. 20, 1981 [JP] Japan ............................. 56-186632

[51] Int. Cl.³ ...................... F02M 25/06; F02B 3/08; F02D 17/00
[52] U.S. Cl. ................................. 123/571; 123/489; 123/480; 123/491; 364/431.06; 364/431.04
[58] Field of Search ............... 123/571, 480, 489, 491; 364/431.06, 431.04

[56] References Cited

U.S. PATENT DOCUMENTS

| | | | |
|---|---|---|---|
| 4,165,722 | 8/1979 | Aoyama | 123/571 |
| 4,181,944 | 1/1980 | Yamauchi et al. | 123/571 |
| 4,347,570 | 8/1982 | Akiyama et al. | 123/571 |
| 4,369,752 | 1/1983 | Ito et al. | 123/568 |
| 4,375,800 | 3/1983 | Otsuka et al. | 123/571 |
| 4,380,989 | 4/1983 | Otsuka et al. | 123/571 |
| 4,388,909 | 6/1983 | Ogasawara et al. | 123/571 X |
| 4,399,791 | 8/1983 | Kobayashi et al. | 123/571 X |
| 4,399,799 | 8/1983 | Romblom et al. | 123/571 |
| 4,409,948 | 10/1983 | Hasegawa et al. | 123/571 |

FOREIGN PATENT DOCUMENTS

| | | | |
|---|---|---|---|
| 17421 | 2/1979 | Japan | 123/571 |
| 20203 | 2/1979 | Japan | 123/571 |
| 38438 | 3/1979 | Japan | 123/571 |
| 2006988 | 5/1979 | United Kingdom | 123/571 |

Primary Examiner—Wendell E. Burns
Attorney, Agent, or Firm—Arthur L. Lessler

[57] ABSTRACT

An electronic fuel injection control system for an internal combustion engine includes means for controlling the exhaust gas recirculation valve by using a plurality of different sets of predetermined valve opening command values which are functions of ambient atmospheric pressure and other parameters of operating condition of the engine, and are set such that the exhaust gas recirculating rate can be maintained constant irrespective of changes in the atmospheric pressure, by the use of these command values, and means for correcting the injection period for fuel being supplied to the engine in dependence upon ambient atmospheric pressure and intake pipe absolute pressure, whereby the air/fuel ratio of the mixture is maintained at an optimum value against changes in the ambient atmospheric pressure even when the exhaust gas recirculation is effected.

7 Claims, 16 Drawing Figures

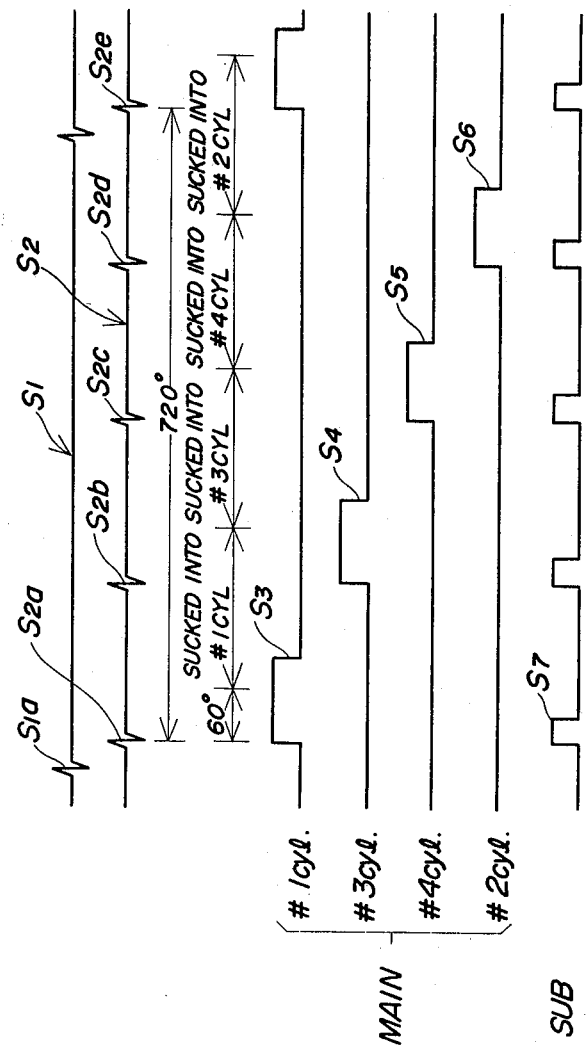

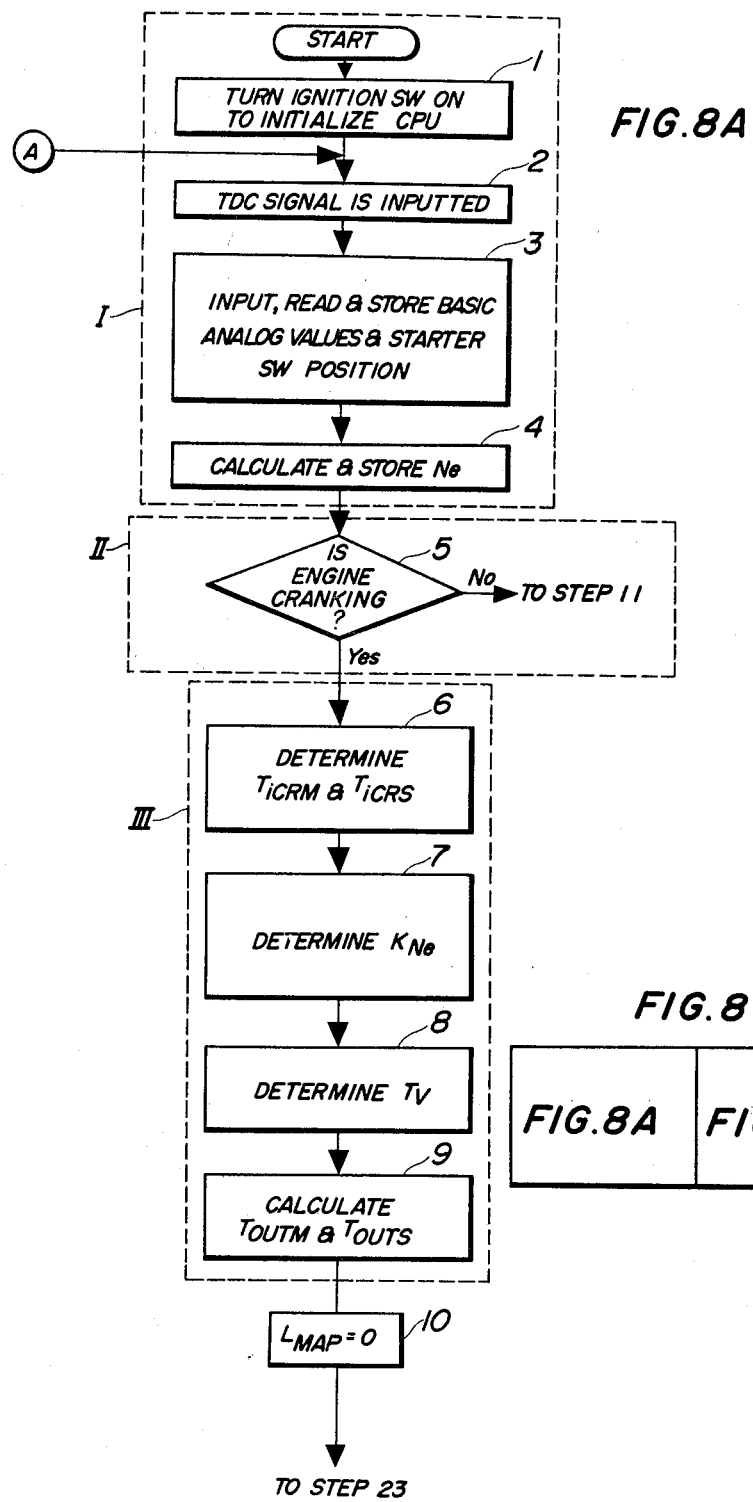

FIG.9

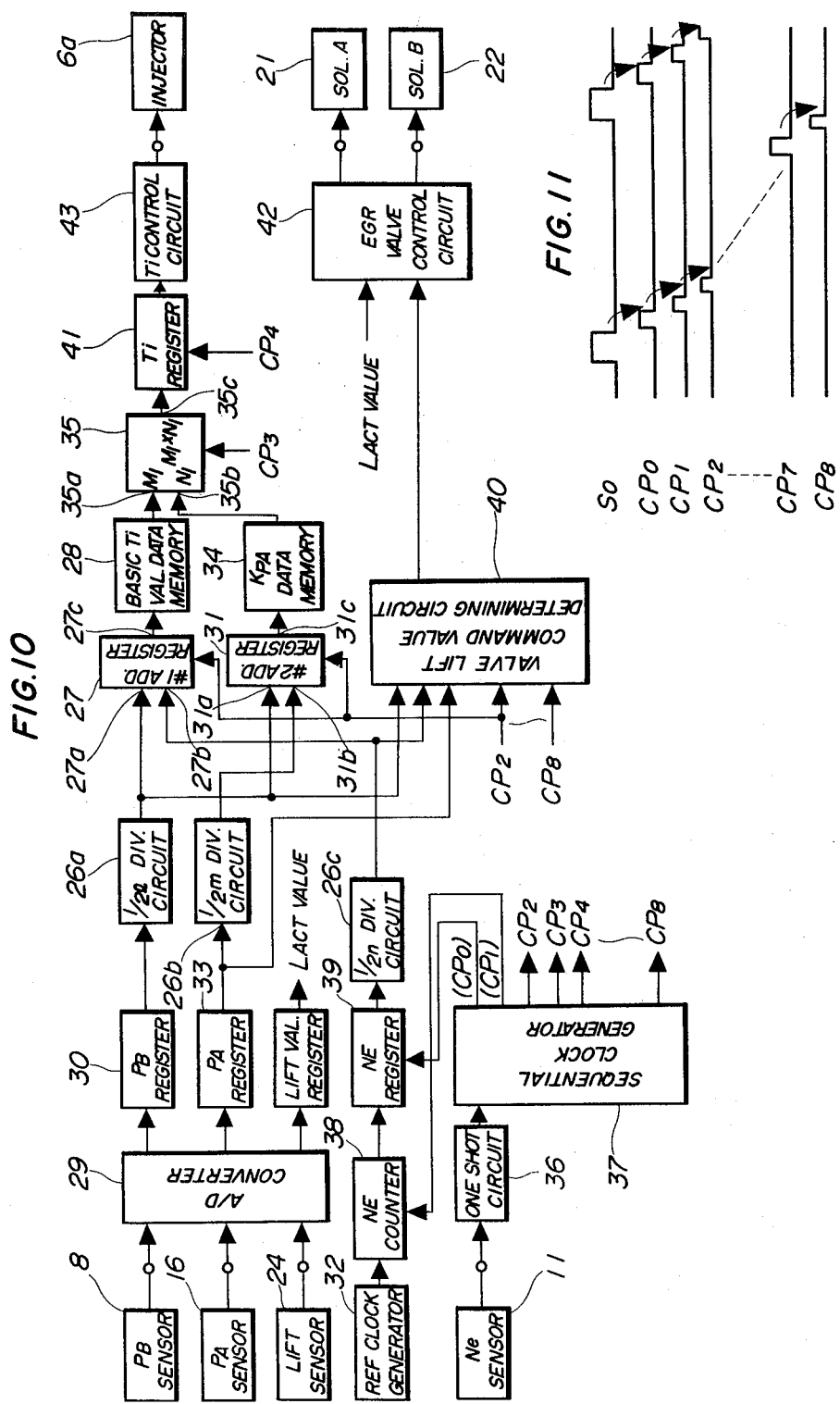

FIG.12

| PB / Ne | PB0 | PB1 | ----- | PB8 | ----- | PBj | ----- | PBk |
|---|---|---|---|---|---|---|---|---|
| Ne0 | Ti,0,0 | | | | | | | |
| Ne1 | Ti,1,0 | Ti,1,1 | | | | | | |
| ----- | | | | | | | | |
| Ne8 | | | | Ti,8,8 | | | | |
| Ne i | | | | | | Ti,ij | | |
| ----- | | | | | | | | |
| Neℓ | | | | | | | | Ti,ℓk |

ALSO APPLICABLE FOR EGR CONTROL (bracket over PB8 ... PBk columns)

ALSO APPLICABLE FOR EGR CONTROL (bracket over Ti,8,8 ... Ti,ℓk rows)

FIG.13

| PB / PA | PB9 | PB10 | ----- | PBj | ----- | PB16 |
|---|---|---|---|---|---|---|
| PA1 | KPA1·9 | KPA1·10 | | | | |
| PA2 | KPA2·9 | KPA2·10 | | | | |
| ----- | | | | | | |
| PAi | | | | KPAij | | |
| ----- | | | | | | |
| PA8 | | | | | | KPA8·16 |

| FIG.14A | FIG.14B |
|---|---|

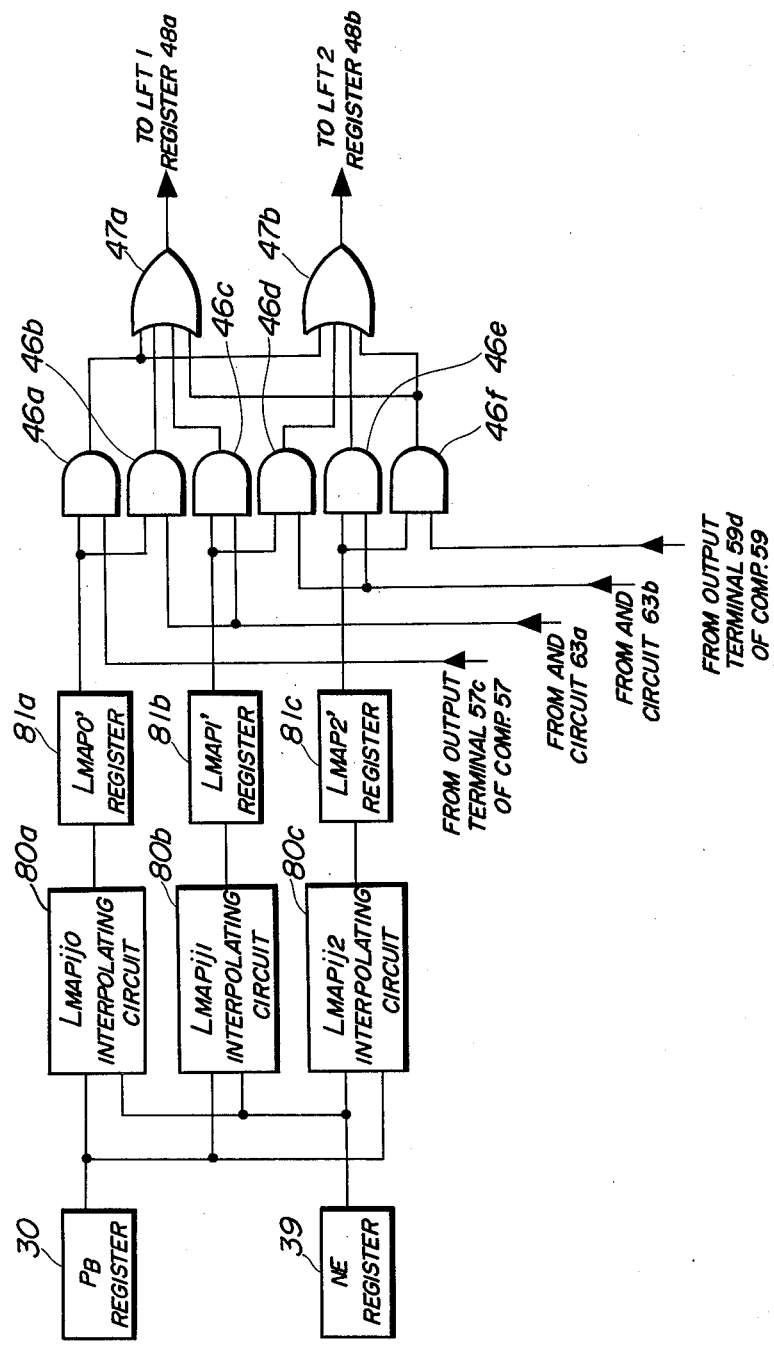

ELECTRONIC FUEL INJECTION CONTROL SYSTEM FOR INTERNAL COMBUSTION ENGINES HAVING EXHAUST GAS RECIRCULATION DEVICES

BACKGROUND OF THE INVENTION

This invention relates to control of the air/fuel ratio of an air/fuel mixture being supplied to an internal combustion engine, and more particularly to an electronic fuel injection control system which is adapted to correct the air/fuel ratio in dependence upon atmospheric pressure and intake pipe absolute pressure so as to maintain the air/fuel ratio at an optimum value during exhaust gas recirculating operation.

A fuel supply control system adapted for use with an internal combustion engine, particularly a gasoline engine has been proposed e.g. by U.S. Ser. No. 348,648, filed Dec. 12, 1981 and assigned to the same assignee as the present application, which is adapted to determine the valve opening period of a fuel injection device for control of the fuel injection quantity, i.e. the air/fuel ratio of an air/fuel mixture being supplied to the engine, by first determining a basic value of the above valve opening period as a function of engine rpm and intake pipe absolute pressure and then adding to and/or multiplying same by constants and/or coefficients being functions of engine rpm, intake pipe absolute pressure, engine temperature, throttle valve opening, exhasut gas ingredient concentration (oxygen concentration), etc., by electronic computing means.

On the other hand, during operation of an engine at a high altitude, etc., it is generally carried out to correct the fuel supply quantity for the engine, in response to changes in the atmospheric pressure, so as to obtain an optimum air/fuel ratio best suited for the atmospheric pressure, for improvements in the fuel consumption, emission characteristics and driveability of the engine.

For instance, in a fuel supply control system adapted for correction of the basic valve opening period of a fuel injection valve by means of a correction coefficient as mentioned above, an atmospheric pressure-dependent correction coefficient is provided as one of the aforementioned correction coefficients, for correction of the air/fuel ratio of the mixture.

However, according to such conventional atmospheric pressure-dependent correction of the air/fuel ratio which is determined by intake pipe absolute pressure as noted above, the air/fuel ratio is corrected in dependence upon the atmospheric pressure alone. That is, the correction amount is not based upon the actual operating condition of the engine per se, making it difficult to perform the air/fuel ratio correction in a perfect manner.

On the other hand, in an engine which is provided with an exhaust gas recirculating device for improvement of the emission characteristics of the engine, absolute pressure in the exhaust gas recirculating passage at a location upstream of the exhaust gas recirculation valve, that is, back pressure in the exhaust pipe decreases with a decrease in the atmospheric pressure so that the exhaust gas recirculating rate decreases. As a consequence, the air/fuel ratio of the mixture becomes leaner. The degree of leaning of the air/fuel ratio is larger during exhaust gas recirculating operation than that when the exhaust gas recirculating operation is not effected.

OBJECT AND SUMMARY OF THE INVENTION

It is the object of the invention to provide an electronic fuel injection control system for an internal combustion engine, which is adapted to correct the air/fuel ratio of an air/fuel mixture being supplied to the engine during exhaust gas recirculating operation, in dependence upon not only atmospheric pressure but also intake pipe absolute pressure, so as to always control the air/fuel ratio to a desired value during exhaust gas recirculating operation, irrespective of changes in the atmospheric pressure, to thereby improve the fuel consumption, emission characteristics and driveability of the engine.

The present invention is based upon the recognitions that the quantity of air sucked into the engine cylinders is variable as a function of intake pipe absolute pressure as well as atmospheric pressure, and the atmospheric pressure-dependent air/fuel ratio correction can be made during exhaust gas recirculating operation, by a correcting amount corresponding to that applied for such correction when the exhaust gas recirculating operation is not effected, if the exhaust gas recirculating rate is maintained constant irrespective of changes in the atmospheric pressure.

The present invention provides an electronic fuel injection control system for use with an internal combustion engine, which comprises in combination: a first sensor for detecting a value of engine rpm; a second sensor for detecting a value of absolute pressure in an intake passage of the engine at a location downstream of a throttle valve arranged in the intake passage; a third sensor for detecting a value of ambient atmospheric absolute pressure; an exhaust gas recirculation passage communicating the exhaust passage of the engine with the intake passage of same at a location downstream of the throttle valve; an exhaust gas recirculation valve arranged across the exhaust gas recirculation passage; and valve opening command means for determining a desired value of the valve opening of the exhaust gas recirculation valve and generating a command signal indicative of the determined valve opening value. The valve opening command means including first memory means stored a plurality of different sets of predetermined valve opening command values previously determined as a function of variables of engine rpm, absolute pressure in the intake passage and atmospheric absolute pressure. The above different sets individually correspond to predetermined different values of one of the above variables. The above predetermined valve opening command values in each of said different sets are functions of the other two variables. The system further comprises in combination with the above elements means responsive to output signals from the first, second and said third sensors to selectively read at least one predetermined valve opening command value corresponding to the output signals from a corresponding set of the above different sets of predetermined valve opening command values; means responsive to the command signal indicative of the read predetermined valve opening command value to control the valve opening of the exhaust gas recirculation valve; whereby a quantity of exhaust gases being recirculated through the exhaust gas recirculation passage is maintained at a constant value with respect to a total intake air quantity being supplied to the engine through the intake passage, irrespective of changes in the ambient atmospheric pressure; means for determining a desired value of a basic valve opening period for the fuel injection valve and generating a first signal indicative of the determined desired valve opening period value, the basic valve opening period determining means including second memory means storing a plurality of predetermined basic valve opening period values being functions of engine rpm and absolute pressure in the intake passage, and means responsive to output signals from the first and second sensors to selectively read as a value of the first signal a desired predetermined basic valve opening period from the second memory means, corresponding to the above output signals; means responsive to output signals from the second and third sensors to correct the value of the first signal and generating a second signal indicative of the corrected valve opening period value; and means responsive to the second signal to drive the fuel injection valve to open for a period of time corresponding to the second signal.

Preferably, means is provided, which is operable to determine a desired valve opening command value from at least two read predetermined valve opening command values and a detected atmospheric absolute pressure value, and also from a detected engine rpm value and/or a detected intake pipe absolute pressure value, if required, by means of interpolation.

The above and other objects, features and advantages of the invention will be more apparent from the ensuing detailed description taken in connection with the accompanying drawings:

BRIEF DESCRIPTION OF THE DRAWINGS

FIG. 7 is a timing chart showing the relationship between a cylinder-discriminating signal and a TDC signal inputted to the ECU, and driving signals for the main injectors and the subinjector, outputted from the ECU;

FIGS. 8A and 8B are a flow chart showing a main program for control of the valve opening periods TOUTM and TOUTS;

FIG. 9 is a view showing a plurality of intake pipe absolute pressure-engine rpm maps for determining lift command values LMAPij for the exhaust gas recirculation valve, individually applicable under different atmospheric pressure values;

FIG. 10 is a block diagram illustrating the internal arrangement of the ECU in FIG. 5, including circuits for determining values of an atmospheric pressure-dependent correction coefficient KPA for correction of the air/fuel ratio and the lift command for the exhaust gas recirculation valve;

FIG. 11 is a timing chart showing the relationship between a pulse signal So inputted to the sequential clock generator in FIG. 10 and clock pulses generated therefrom;

FIG. 12 is a view showing an intake pipe absolute pressure-engine rpm map for determining a basic valve opening period Ti for the injectors;

FIG. 13 is a view showing an atmospheric pressure-intake pipe absolute pressure map for determining values of the correction coefficient KPA;

FIG. 15 is a circuit diagram illustrating essential part of the EGR lift command value determining circuit according to a still further embodiment of the invention.

DETAILED DESCRIPTION

The present invention will now be described in detail with reference to the drawings.

Figure 1:
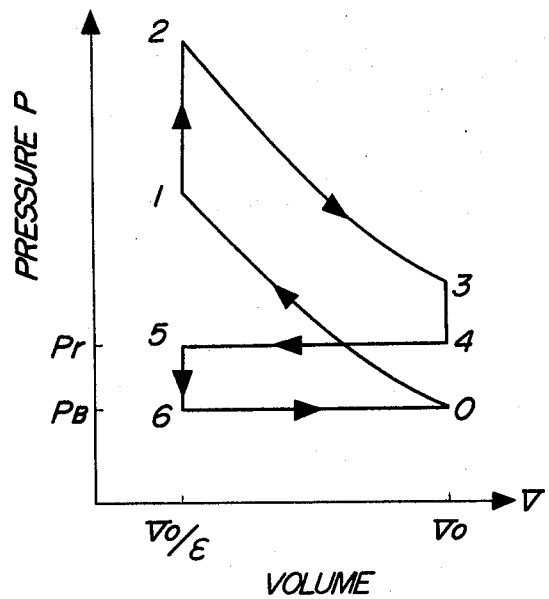
FIG. 1 is a pressure volume diagram of an Otto cycle engine.

FIG. 1 is a pressure volume diagram of an Otto cycle engine. $0 \rightarrow 1$ designates an adiabatic compression step, $1 \rightarrow 2$ an isochoric combustion step, $2 \rightarrow 3$ an adiabatic expansion step, and $3 \rightarrow 4 \rightarrow 5$ an exhaust step, respectively. According to the diagram, when the exhaust valve is closed and simultaneously the intake valve is opened at state point 5, the pressure in the engine cylinder instantaneously drops from a value corresponding to exhaust pipe pressure Pr to a value corresponding to intake pipe pressure PB (step $5 \rightarrow 6$). In the diagram, $6 \rightarrow 0$ designates a suction step where the piston is moved from its top dead center to its bottom dead center.

It will now be explained how the suction gas amount Ga is determined during the step $5 \rightarrow 6 \rightarrow 0$ where fresh air is sucked into the engine cylinder. In the explanation, let it be assumed that first, during the step $5 \rightarrow 6$ the residual gas in the engine cylinder is adiabatically expanded back into the intake pipe, while simultaneously reducing its own pressure from a value corresponding to pressure Pr to a value corresponding to pressure PB, and during the following step $6 \rightarrow 0$, the flowing-back residual gas and fresh air are sucked into the cylinder, while simultaneously exchanging heat with each other. Further, the heat exchange between the cylinder wall and the intake pipe wall, and the residual gas and fresh air is not taken into account in the assumption. Let it be also assumed as a second assumption that the residual gas and fresh air behave as ideal fluid and assume identical values with each other with respect to gas constant Ra, specific heat at constant pressure Cp, specific heat at constant volume Cv, and ratio of specific heat $\kappa$.

Figure 2:
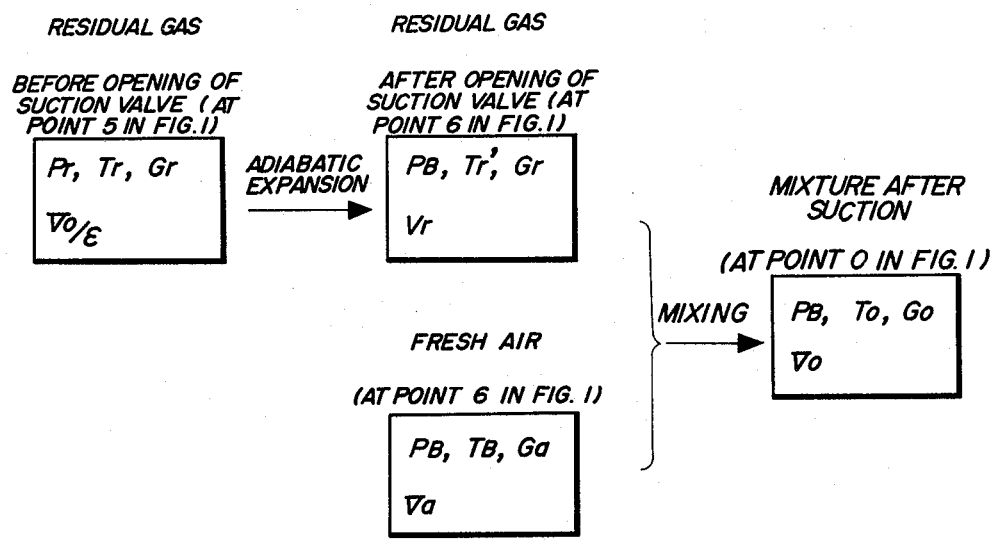
FIG. 2 is a view illustrating quantities of state of residual exhaust gas, fresh air, and a mixture thereof available, respectively, at state points 5, 6 and 0 in FIG. 1.

FIG. 2 shows the quantities of state of the residual gas, the fresh air and a mixture thereof, respectively, at state points 5, 6 and 0. The relationships between these quantities of state can be represented by the following equations. Symbols used in the equations are interpreted as follows:

P = pressure (Kg/cm²abs.),
T = temperature (°K.),
G = quantity of air (Kg),
V = volume (m³),
$\epsilon$ = compression ratio of the engine,
$\kappa$ = ratio of specific heat of air, C=Vo/Ro, which is constant,
r, r'=as of residual gas,
B=as in the intake pipe,
a=as of fresh air, and
o=as at state point 0 in FIG. 1

According to the above second assumption that all the gases have the same value Cv and to the principle of conservation of energy, $$Go \cdot Cv \cdot To = Gr \cdot Cv \cdot Tr' + Ga \cdot Cv \cdot TB \qquad (1)$$

According to the equation of adiabatic change, $$Tr' = Tr(PB/Pr)^{(\kappa-1)/\kappa} \qquad (2)$$

$$Vr = (Vo/\epsilon) \times (Pr/PB)^{1/\kappa} \qquad (3)$$

According to the equation of state, $$Pr \cdot Vo/\epsilon = Gr \cdot Ra \cdot Tr \qquad (4)$$

$$PB \cdot Vr = Gr \cdot Ra \cdot Tr' \qquad (5)$$

$$PB \cdot Va = Ga \cdot Ra \cdot TB \qquad (6)$$

$$PB \cdot Vo = Go \cdot Ra \cdot To \qquad (7)$$

From the equations (1), (5) and (6), $$PB(Vr + Va) = Ra \cdot Go \cdot To \qquad (8)$$

If the equation (7) is substituted into the equation (8), $$Vr + Va = Vo \qquad (9)$$

The equation (9) shows that the mixture does not change in volume so long as its own pressure is constant.

If the equations (3) and (6) are applied to the equation (9), $$Ga = C \cdot PB/TB \{1 - (1/\epsilon)(Pr/PB)^{1/\kappa}\} \qquad (10)$$

The equation (10) forms the basic principle of the present invention, showing that the quantity of suction air Ga is given as a function of intake pipe pressure PB, intake pipe temperature TB, and exhaust pipe pressure Pr.

In the event that there occurs a change in the back pressure or exhaust pipe pressure Pr at the step 3-4-5 in FIG. 1, in order to control the actual air/fuel ratio Ga/Gf (Gf=fuel quantity) to an air/fuel ratio Gao/Gfo at standard atmospheric pressure, that is, in order to satisfy the following equation:

$$Ga/Gf = Gao/Gfo \qquad (11),$$

a quantity of fuel has to be supplied to the engine, which is determined by the following equation:

$$Gf = Gfo \times Ga/Gao = Gfo \times \frac{1 - (1/\epsilon)(Pr/PB)^{1/x}}{1 - (1/\epsilon)(Pro/PB)^{1/x}} \qquad (12)$$

provided that TB remains constant.

Next, let us consider about the relationship between the back pressure Pr and the required fuel supply quantity, which is required for an engine during exhaust gas recirculation. Provided that the exhaust gas recirculation quantity is designated by GE, the quantity of fresh intake air Ga', and the total intake air quantity GT, $$GT = Ga' + GE \qquad (13)$$

Although the equation (10) is based upon the assumption that fresh air alone is present in the intake pipe, theoretically the same equation can be satisfied even if the intake air in the intake pipe comprises a mixture of fresh air and exhaust gases returned from the exhaust pipe. That is, the total intake air quantity GT can be determined from the following equation:

$$GT = C(PB/TB)\{1 - (1/\epsilon)(Pr/PB)^{1/\kappa}\} \qquad (14)$$

It will be leaned from the equation (14) that the total intake air quantity GT increases with a decrease in the back pressure PR.

On the other hand, the exhaust gas recirculation quantity QE (m²/sec) obtained can be represented as follows:

QE ∝ (the effective valve opening area A of the exhaust gas recirculation valve)×(the differential pressure ΔP between the exhaust gas recirculation valve)$^n$ provided that n is equal to ½−1. If the effective valve opening area A of the exhaust gas recirculation valve remains constant, $$QE \propto \Delta P^n = (Pr - PB)^n \qquad (15)$$

When there occurs a drop in the atmospheric pressure, the back pressure Pr correspondingly decreases so that the value ΔP decreases with the decrease of the back pressure Pr, so long as the intake pipe absolute pressure PB remains constant. Accordingly, the exhaust gas recirculating quantity GE, which is expressed in terms of mass flow rate as equivalent to the quantity QE, also decreases. From the above, it will be learned that the exhaust gas recirculation rate XE (=GE/(Ga+GE)=GE/GT) decreases with a drop in the atmospheric pressure.

Figure 3:
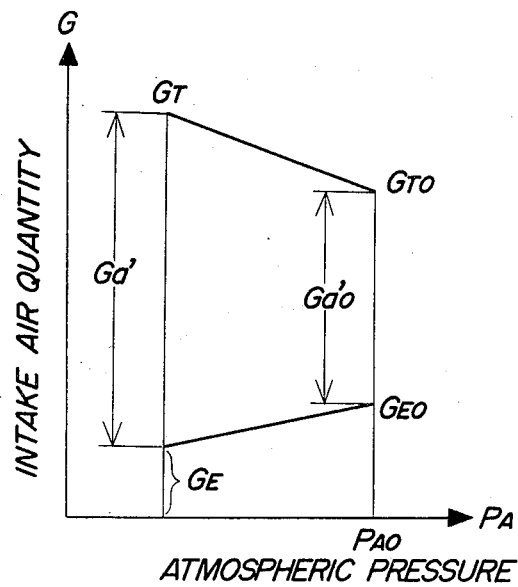
FIG. 3 is a graph showing the relationship between exhaust gas recirculating quantity, total intake air quantity and atmospheric pressure.

FIG. 3 endorses the above explanation, showing that the air/fuel ratio becomes lean to a larger extent when there occurs a drop in the atmospheric pressure during exhaust gas recirculating operation than when the exhaust gas recirculating operation is not effected. That is, the total intake air quantity GT increases when the atmospheric pressure PA drops below the standard atmospheric pressure PAo, irrespective of the exhaust gas recirculation quantity, in accordance with the equation (14). On the other hand, the exhaust gas recirculation quantity GE decreases with a decrease in the atmospheric pressure in accordance with the equation (15). Accordingly, the quantity of fresh intake air Ga' (=GT−GE) increases at a rate larger than the increase of the total intake air quantity GT. Also, the increase rate of the total intake air quantity GT becomes larger in proportion to the exhaust gas recirculation quantity GEo under the standard atmospheric pressure PAo. Therefore, it will be learned that the air/fuel ratio will become lean to a larger extent when the exhaust gas recirculating operation is carried out than when the same operation is interrupted, if no atmospheric pressure-dependent correction of the air/fuel ratio is carried out.

Figure 4:
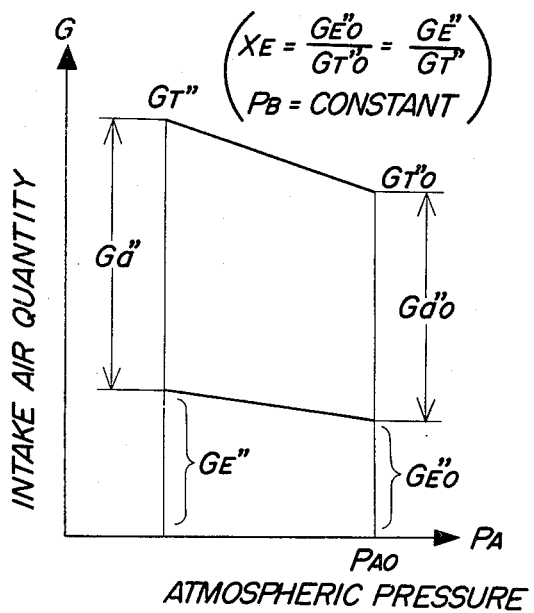
FIG. 4 is a graph showing the relationship between exhaust gas recirculating quantity, total intake air quantity and atmospheric pressure, which is required for maintaining the exhaust gas recirculating rate constant.

To control the exhaust gas recirculation quantity GE" so as to maintain the exhaust gas recirculation rate XE at a constant value independently of changes in the atmospheric pressure, as shown in FIG. 4, the following relationship must be fulfilled, as derived from the equation (14), provided that the values PB and TB remain constant:

$$GT = GT_o \cdot \frac{1 - (1/\epsilon)(Pr/PB)^{1/x}}{1 - (1/\epsilon)(Pr_o/PB)^{1/x}} \quad (16)$$

If an air/fuel ratio obtained at the standard atmospheric pressure PAo, is designated by $a_o$ ($=Ga''o/Gf''o$, where $Gf''o$ is a fuel quantity), and an air/fuel ratio at actual atmospheric pressure $a$ ($=Ga''/Gf''$), respectively, the follwing equation can be derived from the equations (13) and (16), and an equation of $XE=GE'-'o/GT''o=GE''/GT''$:

$$a = a_0(Gf''o/Gf'') \cdot \frac{1 - (1/\epsilon)(Pr/PB)^{1/x}}{1 - (1/\epsilon)(Pr_o/PB)^{1/x}} \quad (17)$$

To make the air/fuel ratio $a$ equal to the one $a_o$, the following equation must be fulfilled:

$$Gf'' = Gf''o \cdot \frac{1 - (1/\epsilon)(Pr/PB)^{1/x}}{1 - (1/\epsilon)(Pr_o/PB)^{1/x}} \quad (18)$$

In an internal combustion engine which does not include an element requiring high exhaust pressure, such as a turbocharger, the difference between the pressure Pr and the pressure PA is ignorably small, as compared with the difference between the pressure Pr and the intake pipe pressure PB. Therefore, from the equation (18), the following equations can be reached:

$$Gf' = KPA \times Gf''o \quad (19)$$

$$KPA = \frac{1 - (1/\epsilon)(PA/PB)^{1/x}}{1 - (1/\epsilon)(PA_o/PB)^{1/x}} \quad (20)$$

where PA designates actual atmospheric pressure (absolute pressure), PAo standard atmospheric pressure, and KPA an atmospheric pressure-dependent correction coefficient, hereinlater referred to, respectively.

To obtain a desired air/fuel ratio, a fuel quantity Gf' given by the equation (19) has only to be supplied to the engine. That is, so long as the exhaust gas recirculation quantity GE is controlled so as to keep the exhaust gas recirculation rate XE constant irrespective of changes in the atmospheric pressure, during exhaust gas recirculation the air/fuel ratio can be corrected by the use of the correction coefficient KPA obtained by the equation (20) which is the same as that applicable when the exhaust gas recirculation is not effected, as will be understood by comparing between the two equations (12) and (18).

As noted above, the atmospheric pressure-dependent correction coefficient KPA can be determined as a function of actual atmospheric pressure PA and actual intake pipe absolute pressure PB on condition that the exhaust gas recirculation rate XE remains constant, irrespective of whether or not the exhaust gas recirculation is effected, though the coefficient value KPA basically depends upon the compression ratio of the engine.

The electronic fuel injection control system according to the present invention will now be described in detail with reference to FIGS. 5 through 14, which is capable of controlling the exhaust gas recirculation so as to maintain the exhaust gas recirculating rate at a constant value irrespective of changes in the atmospheric pressure, as well as controlling the air/fuel ratio of the mixture by using the correction coefficient KPA.

Figure 5:
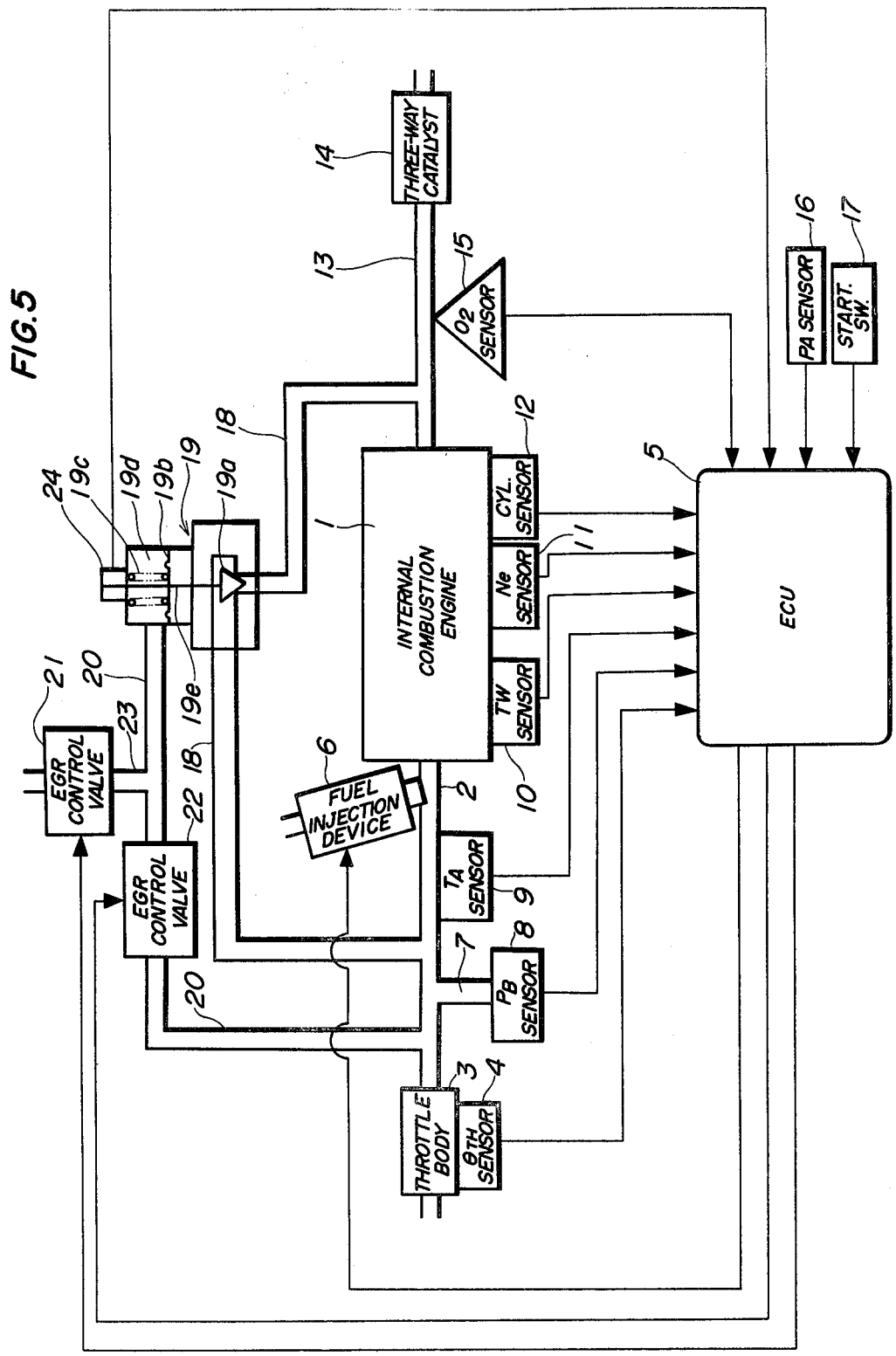
FIG. 5 is a block diagram illustrating the arrangement of a fuel injection control system according to the present invention.

Referring first to FIG. 5, there is illustrated the whole arrangement of a fuel supply control system for internal combustion engines, according to the present invention. Reference numeral 1 designates an internal combustion engine which may be a four-cylinder type, for instance. This engine 1 has main combustion chambers which may be four in number and sub combustion chambers communicating with the main combustion chambers, none of which is shown. An intake pipe 2 is connected to the engine 1, which comprises a main intake pipe communicating with each main combustion chamber, and a sub intake pipe with each sub combustion chamber, respectively, neither of which is shown. Arranged across the intake pipe 2 is a throttle body 3 which accommodates a main throttle valve and a sub throttle valve mounted in the main intake pipe and the sub intake pipe, respectively, for synchronous operation. Neither of the two throttle valves is shown. A throttle valve opening sensor 4 is connected to the main throttle valve for detecting its valve opening and converting same into an electrical signal which is supplied to an electronic control unit (hereinafter called "ECU") 5.

A fuel injection device 6 is arranged in the intake pipe 2 at a location between the engine 1 and the throttle body 3, which comprises main injectors and a subinjector, all formed by electromagnetically operated fuel injection valves, none of which is shown in FIG. 1. The main injectors correspond in number to the engine cylinders and are each arranged in the main intake pipe at a location slightly upstream of an intake valve, not shown, of a corresponding engine cylinder, while the subinjector, which is single in number, is arranged in the sub intake pipe at a location slightly downstream of the sub throttle valve, for supplying fuel to all the engine cylinders. The fuel injection device 6 is connected to a fuel pump, not shown. The main injectors and the subinjector are electrically connected to the ECU 5 in a manner having their valve opening periods or fuel injection quantities controlled by driving signals supplied from the ECU 5.

On the other hand, an absolute pressure sensor 8 communicates through a conduit 7 with the interior of the main intake pipe at a location immediately downstream of the main throttle valve of the throttle body 3. The absolute pressure sensor 8 is adapted to detect absolute pressure in the intake pipe 2 and apply an electrical signal indicative of detected absolute pressure to the ECU 5. An intake air temperature sensor 9 is arranged in the intake pipe 2 at a location downstream of the absolute pressure sensor 8 and also electrically connected to the ECU 5 for supplying thereto an electrical signal indicative of detected intake air temperature.

An engine temperature sensor 10, which may be formed of a thermistor or the like, is mounted on the main body of the engine 1 in a manner embedded in the peripheral wall of an engine cylinder having its interior filled with cooling water, an electrical output signal of which is supplied to the ECU 5.

An engine rpm sensor (hereinafter called "Ne sensor") 11 and a cylinder-discriminating sensor 12 are arranged in facing relation to a camshaft, not shown, of the engine 1 or a crankshaft of same, not shown. The former 11 is adapted to generate one pulse at a particular crank angle each time the engine crankshaft rotates through 180 degrees, i.e., a pulse of the top-dead-center position (TDC) signal, while the latter is adapted to generate one pulse at a particular crank angle of a particular engine cylinder. The above pulses generated by the sensors 11, 12 are supplied to the ECU 5.

A three-way catalyst 14 is arranged in an exhaust pipe 13 extending from the main body of the engine 1 for purifying ingredients HC, CO and NOx contained in the exhaust gases. An $O_2$ sensor 15 is inserted in the exhaust pipe 13 at a location upstream of the three-way catalyst 14 for detecting the concentration of oxygen in the exhaust gases and supplying an electrical signal indicative of a detected concentration value to the ECU 5.

Further connected to the ECU 5 are a sensor 16 for detecting atmospheric pressure and a starting switch 17 of the engine, respectively, for supplying an electrical signal indicative of detected atmospheric pressure and an electrical signal indicative of its own on and off positions to the ECU 5.

An exhaust gas recirculating passageway 18 is provided which connects the exhaust pipe 13 to the intake pipe 2, and across which is mounted an exhaust gas recirculation valve 19. This valve 19 is a negative pressure-actuated type and comprises a valve body 19a arranged for opening and closing the passageway 18, a diaphragm 19b coupled to the valve body 19a by means of a valve rod 19e and actuatable by atmospheric pressure or negative pressure which is selectively applied thereto by means of EGR control valves 21 and 22, hereinafter referred to, and a spring 19c urging the diaphragm 19b in the valve closing direction. A negative pressure chamber 19d is defined by the diaphragm 19b, which is connected to a communication passageway 20 for introducing absolute pressure in the intake pipe 2 by way of the EGR control valve 22 which is a normally closed type and arranged across the communication passageway 20. An atmospheric pressure-intake passageway 23 is joined to the communication passageway 20 at a location downstream of the EGR control valve 22 so that atmospheric pressure is introduced into the communication passageway 20 by way of the EGR control valve 21 which is a normally open type and which is arranged across the communication passageway 23, and then guided into the negative pressure chamber 19d. The EGR control valves 21 and 22 are both electrically connected to the ECU 5 for operation in unison with each other or alone in response to control signals from the ECU 5 to control the lifting motion of the valve body 19a of the exhaust gas recirculation valve 19 and the moving speed thereof.

A lift sensor 24, which may be formed of a potentiometer, is mounted on the exhaust gas recirculation valve 19 for detecting the operating position of the valve body 19a of the valve 19 and supplying an electrical signal indicative of its detected operating position of the valve body to the ECU 5.

Next, details of the manner of control of the fuel supply quantity and the exhaust gas recirculation of the fuel supply control system outlined above will now be described with reference to FIG. 5 referred to above as well as FIGS. 6 through 14.

Figure 6:
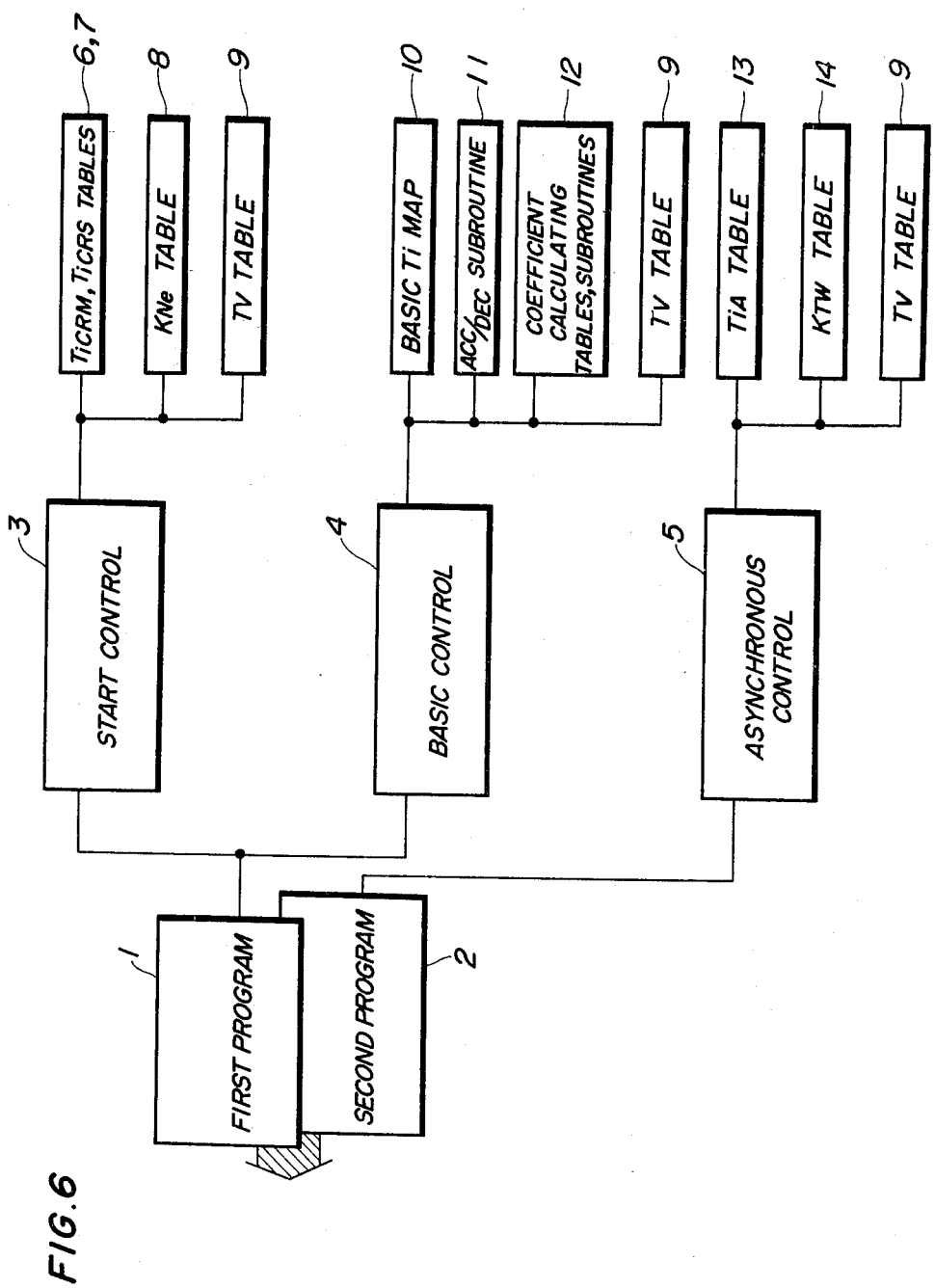
FIG. 6 is a block diagram illustrating a whole program for control of the valve opening periods TOUTM and TOUTS of the main injectors and the subinjector, which is incorporated in the electronic control unit (ECU) in FIG. 5.

FIG. 6 shows a block diagram showing the whole program for air/fuel ratio control, i.e., control of the valve opening periods TOUTM and TOUTS of the main injectors and the subinjector, which is executed by the ECU 5. The program comprises a first program 1 and a second program 2. The first program 1 is used for fuel quantity control in synchronism with the TDC signal, hereinafter merely called "synchronous control" unless otherwise specified, and comprises a start control subroutine 3 and a basic control subroutine 4, while the second program 2 comprises an asynchronous control subroutine 5 which is carried out in asynchronism with or independently of the TDC signal.

In the start control subroutine 3, the valve opening periods TOUTM and TOUTS are determined by the following basic equations:

$$TOUTM = TiCRM \times KNe + (TV + \Delta TV) \quad (21)$$

$$TOUTS = TiCRS \times KNe + TV \quad (22)$$

where TiCRM and TiCRS represent basic values of the valve opening periods for the main injectors and the subinjector, respectively, which are determined from a TiCRM table 6 and a TiCRS table 7, respectively, KNe represents a correction coefficient applicable at the start of the engine, which is variable as a function of engine rpm Ne and determined from a KNe table 8, and TV represents a constant for increasing and decreasing the valve opening period in response to changes in the output voltage of the battery, which is determined from a TV table 9. $\Delta TV$ is added to TV applicable to the main injectors as distinct from TV applicable to the subinjector, because the main injectors are structurally different from the subinjector and therefore have different operating characteristics.

The basic equations for determining the values of TOUTM and TOUTS applicable to the basic control subroutine 4 are as follows:

$$TOUTM = (TiM - TDEC) \times (KTA \times KTW - \\ \times KAFC \times KPA \times KAST \times KWOT \times KO_2 \times KLS) - \\ + TACC \times (KTA \times KTWT \times KAFC) + (TV + \Delta TV) \quad (23)$$

$$TOUTS = (TiS - TDEC) \times (KTA \times KTW - \\ \times KAST \times KPA) + TV \quad (24)$$

where TiM and TiS represent basic values of the valve opening periods for the main injectors and the subinjector, respectively, and can be determined from a basic Ti map 10, and TDEC and TACC represent constants applicable, respectively, at engine decceleration and at engine acceleration and are determined by acceleration and decceleration subroutines 11. The coefficients KTA, KTW, etc. are determined by their respective tables and/or subroutines 12. KTA is an intake air temperature-dependent correction coefficient and is determined from a table as a function of actual intake air temperature, KTW a fuel increasing coefficient which is determined from a table as a function of actual engine cooling water temperature TW, KAFC a fuel increasing coefficient applicable after fuel cut operation and determined by a subroutine, KPA an atmospheric pressure-dependent correction coefficient determined from a table as a function of actual atmospheric pressure, and KAST a fuel increasing coefficient applicable after the start of the engine and determined by a subroutine. KWOT is a coefficient for enriching the air/fuel mixture, which is applicable at wide-open-throttle and has a constant value, $KO_2$ an "$O_2$ feedback control" correction coefficient determined by a subroutine as a function of actual oxygen concentration in the exhaust gases, and KLS a mixture-leaning coefficient applicable at "lean stoich." operation and having a constant value. The term "stoich." is an abbreviation of a word "stoichiometric" and means a stoichiometric or theoretical air/fuel ratio of the mixture.

On the other hand, the valve opening period TMA for the main injectors which is applicable in asynchronism with the TDC signal is determined by the following equation:

$$TMA = TiA \times KTWT \times KAST + (TV + \Delta TV) \quad (25)$$

where TiA represents a TDC signal-asynchronous fuel increasing basic value applicable at engine acceleration and in asynchronism with the TDC signal. This TiA value is determined from a TiA table 13. KTWT is defined as a fuel increasing coefficient applicable at and after TDC signal-synchronous acceleration control as well as at TDC signal-asynchronous acceleration control, and is calculated from a value of the aforementioned water temperature-dependent fuel increasing coefficient KTW obtained from the table 14.

FIG. 7 is a timing chart showing the relationship between the cylinder-discriminating signal and the TDC signal, both inputted to the ECU 5, and the driving signals outputted from the ECU 5 for driving the main injectors and the subinjector. The cylinder-discriminating signal $S_1$ is inputted to the ECU 5 in the form of a pulse $S_{1a}$ each time the engine crankshaft rotates through 720 degrees. Pulses $S_{2a}$–$S_{2e}$ forming the TDC signal $S_2$ are each inputted to the ECU 5 each time the engine crankshaft rotates through 180 degrees. The relationship in timing between the two signals $S_1$, $S_2$ determines the output timing of driving signals $S_3$–$S_6$ for driving the main injectors of the four engine cylinders. More specifically, the driving signal $S_3$ is outputted for driving the main injector of the first engine cylinder, concurrently with the first TDC signal pulse $S_{2a}$, the driving signal $S_4$ for the third engine cylinder concurrently with the second TDC signal pulse $S_{2b}$, the driving signal $S_5$ for the fourth cylinder concurrently with the third pulse $S_{2c}$, and the driving signal $S_6$ for the second cylinder concurrently with the fourth pulse $S_{2d}$, respectively. The subinjector driving signal $S_7$ is generated in the form of a pulse upon application of each pulse of the TDC signal to the ECU 5, that is, each time the crankshaft rotates through 180 degrees. It is so arranged that the pulses $S_{2a}$, $S_{2b}$, etc. of the TDC signal are each generated earlier by 60 degrees than the time when the piston in an associated engine cylinder reaches its top dead center, so as to compensate for arithmetic operation lag in the ECU 5, and a time lag between the formation of a mixture and the suction of the mixture into the engine cylinder, which depends upon the opening action of the intake pipe before the piston reaches its top dead center and the operation of the associated injector.

Figure 8B:
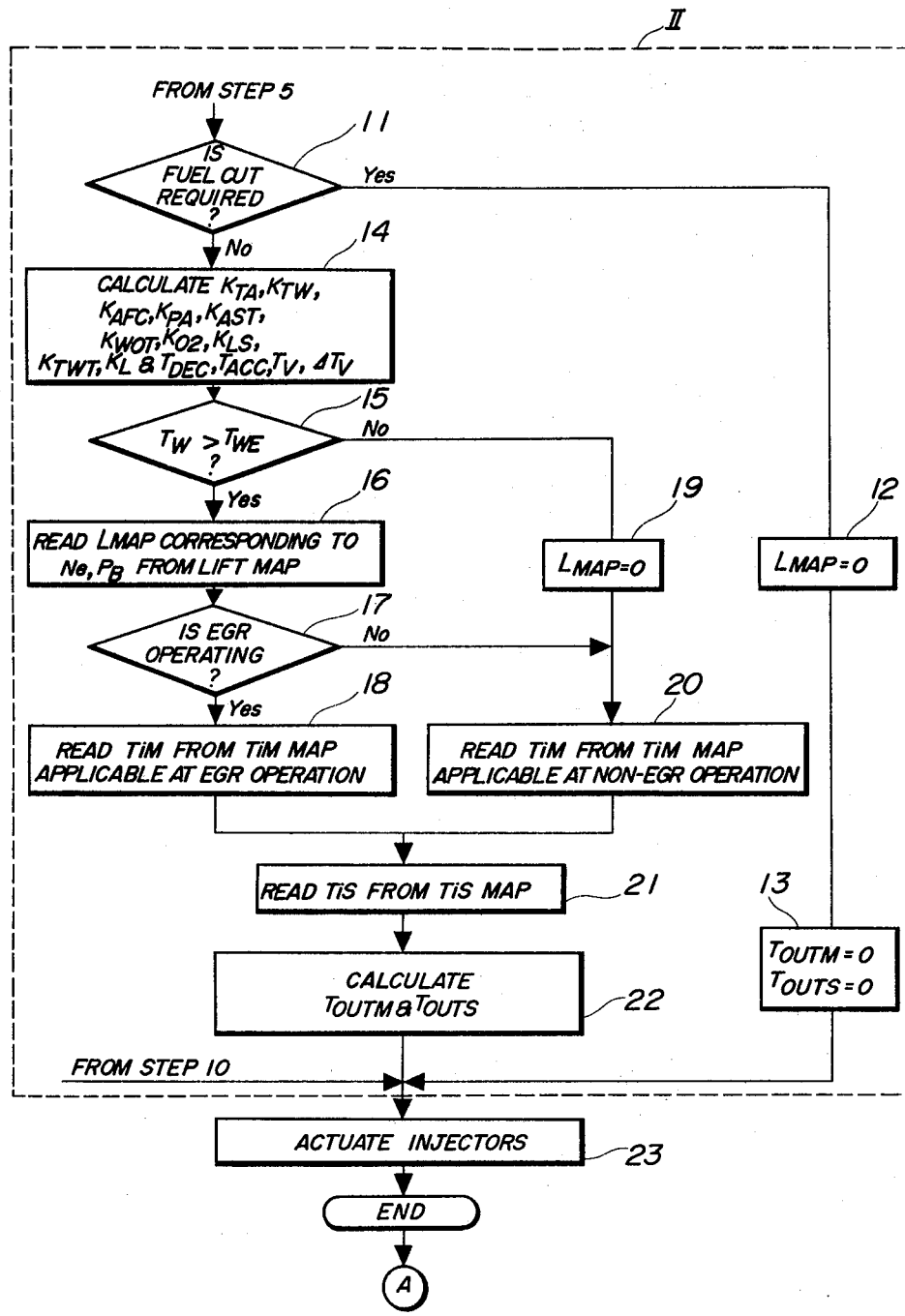

Referring next to FIG. 8, there is shown a flow chart of the aforementioned first program 1 for control of the valve opening period in synchronism with the TDC signal in the ECU 5. The whole program comprises an input signal processing block I, a basic control block II and a start control block III. First in the input processing block I, when the ignition switch of the engine is turned on, a CPU in the ECU 5 is initialized at the step 1 and the TDC signal is inputted to the ECU 5 as the engine starts at the step 2. Then, all basic analog values are inputted to the ECU 5, which include detected values of atmospheric pressure PA, abolute pressure PB, engine cooling water temperature TW, atmospheric air temperature TA, valve lift L of the exhaust gas recirculating valve 19, throttle valve opening $\theta$th, battery voltage V, output voltage value V of the $O_2$ sensor and on-off state of the starting switch 17, some necessary ones of which are then stored therein (step 3). Further, the period between a pulse of the TDC signal and the next pulse of same is counted to calculate actual engine rpm Ne on the basis of the counted value, and the calculated value is stored in the ECU 5 (step 4). The program then proceeds to the basic control block II. In this block, a determination is made, using the calculated Ne value, as to whether or not the engine rpm is smaller than the cranking rpm (starting rpm) at the step 5. If the answer is affirmative, the program proceeds to the start control subroutine III. In this block, values of TiCRM and TiCRS are selected from a TiCRM table and a TiCRS table, respectively, on the basis of the detected value of engine cooling water temperature TW (step 6). Also, the value of Ne-dependent correction coefficient KNe is determined by using the KNe table (step 7). Further, the value of battery voltage-dependent correction constant TV is determined by using the TV table (step 8). These determined values are applied to the aforementioned equations (21), (22) to calculate the values of TOUTM and TOUTS (step 9).

Figure 9:
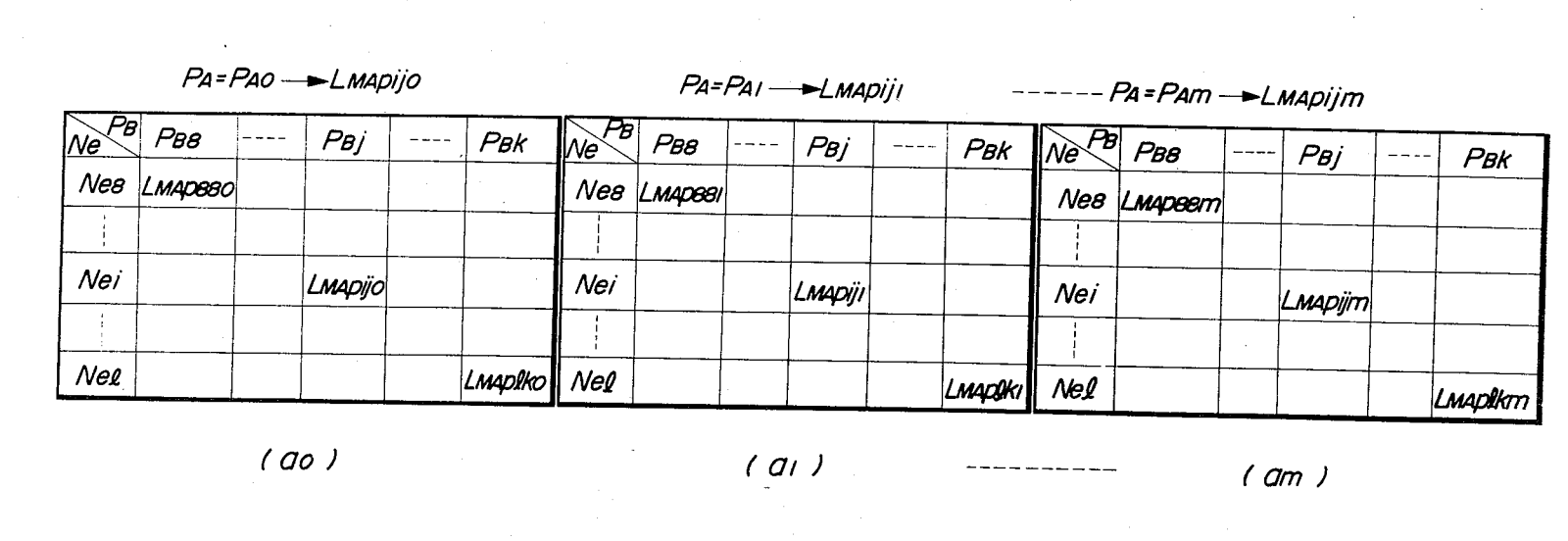

During the start control subroutine III described above, a valve lift command value LMAP which indicates zero lift is selected at the step 10, to set the valve body lift of the exhaust gas recirculation valve 19 to zero. FIG. 9 shows a plurality of maps for determining lift command values for the exhaust gas recirculation valve, which are selected according to atmospheric pressure PA, intake pipe absolute pressure PB and engine rpm Ne. The a0th map in FIG. 9 is provided with a set of lift command values LMAPij applicable when the atmospheric pressure PA has a value PA0 equal to the standard atmospheric pressure, e.g. 760 mmHg, and the a1th map a set of lift command values LMAPij1 applicable when the atmospheric pressure PA has a value PA1, e.g. 750 mmHg. In the same manner as above, the amth map in FIG. 9 is provided with a set of lift command values LMAPijm applicable when the atmospheric pressure PA has a value PAm. The command values in the maps are previously experimentally determined as a function of intake pipe absolute pressure PB and engine rpm Ne. According to the exhaust gas recirculation control using these a0th–amth maps, which will be described hereinlater, lift command values LMAP are selected in such a manner as to maintain the exhaust gas recirculating rate at a constant value irrespective of changes in the atmospheric pressure. The number (m+1) of maps, and the number of predetermined PB and Ne values in the maps are set at respective suitable values. If a detected PB or Ne value falls between adjacent predetermined PB or Ne values in each of the maps, the lift command value LMAP may be determined by means of an interpolation method.

If the answer to the question of the above step 5 in FIG. 8 is no, it is determined whether or not the engine is in a condition for carrying out fuel cut, at the step 11. If the answer is yes, a lift command value LMAP is selected which indicates zero lift, at the step 12, and simultaneously the values of TOUTM and TOUTS are set to zero, at the step 13.

On the other hand, if the answer to the question of the step 11 is negative, calculations are carried out of values of correction coefficients KTA, KTW, KAFC, KPA, KAST, KWOT, $KO_2$, KLS, KTWT, etc. and values of correction constants TDEC, TACC, TV and $\Delta$TV, by means of the respective calculation subroutines and tables, at the step 14.

Then, a comparison is made of whether or not actual engine cooling water temperature TW is higher than a predetermined value TWE for carrying out the exhaust gas recirculating operation, at the step 15. If it is found that the former is higher than the latter, a lift command value LMAP is selected from the lift command value map, which corresponds to actual engine rpm Ne and actual intake pipe absolute pressure PB, at the step 16. Then, it is determined whether or not the exhaust gas recirculation valve 19 is operating, at the step 17. The engine operation where the valve 19 is operating will be referred to as "EGR operation" hereinafter, and that where it is at rest as "non-EGR operation", respectively. If the answer to the question of the step 17 is yes, a basic valve opening period value TiM is selected from a TiM map applicable during EGR operation, which corresponds to acutal engine rpm Ne and actual absolute pressure PB, at the step 18. If the answer is negative at the step 17, another basic valve opening value TiM is selected from another map of the TiM value applicable during non-EGR operation, which corresponds to actual engine rpm Ne and actual absolute pressure PB, at the step 20.

On the other hand, if the determination at the step 15 gives a negative answer, a lift command value LMAP indicative of zero lift is selected at the step 19, while simultaneously a basic value TiM is selected from the non-EGR operation TiM map, which corresponds to actual engine rpm Ne and actual absolute pressure PB, at the step 20.

Following the above selection of the basic value TiM, a basic valve opening period value TiS is selected from a map of the TiS value, which corresponds to actual engine rmp Ne and actual absolute pressure PB, at the step 21.

Then, calculations are carried out of the values TOUTM, TOUTS on the basis of the values of correction coefficients and correction constants selected as described above, using the aforementioned equation (23), (24) (step 22). The main injectors and the subinjector are actuated with valve opening periods corresponding to the values of TOUTM, TOUTS obtained by the aforementioned steps 9, 13 and 22 (step 23).

As previously stated, in addition to the above-described control of the valve opening periods of the main injectors and the subinjector in synchronism with the TDC signal, asynchronous control of the valve opening periods of the main injectors is carried out in a manner asynchronous with the TDC signal but synchronous with a certain pulse signal having a constant pulse repetition period, detailed description of which is omitted here.

FIG. 10 illustrates the whole internal arrangement of the ECU 5, including circuits for determining values of the air/fuel ratio correction coefficient KPA and the lift command value LMAP of the exhaust gas recirculation value 19, both previously referred to.

The intake pipe absolute pressure PB sensor 8, the atmospheric pressure PA sensor 16 and the EGR lift sensor 24, all appearing in FIG. 5, are connected, respectively, to a PB value register 30, a PA value register 33 and a lift value register 25 at their inputs, through an A/D converter unit 29. The PB value register 30 has its output connected to an input terminal 27a of a first address register 27, an input terminal 31a of a second address register 31 and the input of an EGR valve lift command value determining circuit 40 by way of a $\frac{1}{2}^l$ dividing circuit 26a. The PA value register 33 has its output connected directly to the input of the EGR valve lift command value determining circuit 40, and also to the other input terminal 31b of the second address register 31 by way of a $\frac{1}{2}^m$ dividing circuit 26b. The lift value register 25 has its output connected to the input of an EGR control valve control circuit 42. The engine rpm Ne sensor in FIG. 5 is connected to the input of a sequential clock generator 37 by way of a one-shot circuit 36. The sequential clock generator 37 has its output connected to the inputs of the first address register 27, the second address register 31, a multiplier 35, an NE value counter 38, an NE value register 39, the EGR valve lift command value determining circuit 40 and an Ti value register 41. A reference clock generator 32 is connected to the NE value counter 38. The reference clock generator 32, the NE value counter 38, the NE value register 39 and a $\frac{1}{2}^n$ dividing circuit 26c are serially connected to each other in the order mentioned. The $\frac{1}{2}^n$ dividing circuit 26c is connected to the other input terminal 27b of the first address register 27 and to the input of the EGR valve lift command value determining circuit 40. The first address register 27 has its output connected to an input terminal 35a of the multiplier 35 by way of a basic Ti value data memory 28, and the second address register 31 has its output connected to the other input terminal 35b of the multiplier 35 by way of a KPA value data memory 34. The multiplier 35 has its output terminal 35c connected to the input of a Ti value control circuit 43 by way of the Ti value register 41. The Ti value control circuit 43 has its output connected to an injector or injectors 6a of the fuel injection device 6 in FIG. 5. The EGR valve lift command value determining circuit 40 has its output connected to the input of the EGR control valve control circuit 42. The EGR control valve control circuit 42 has its output connected to the EGR control valves 21 and 22 in FIG. 5, which are shown in FIG. 10 as EGR solenoid-A and EGR solenoid-B, respectively.

A TDC signal outputted from the engine rpm Ne sensor in FIG. 5 is supplied to the one-shot circuit 36 which forms a waveform shaping circuit in cooperation with the adjacent sequential clock generator 37. The one-shot circuit 36 generates an output pulse So each time a pulse of the TDC signal is applied thereto, and the output pulse So actuates the sequential clock generator 37 to sequentially generate clock pulses CP0-8, as shown in FIG. 11. The first clock pulse CP0 is supplied to the engine rpm Ne value register 39 to cause a count in the NE value counter, which permanently counts clock pulses from the reference clock pulse generator 32, to be loaded into the same register 39. Then, the second clock pulse CP1 is supplied to the NE value counter 38 to reset the count in the counter 38 to zero. Therefore, the engine rpm Ne is measured in the form of a number of reference clock pulses counted between a pulse of the TDC signal and a next one of same, and the count indicative of the measured Ne value is loaded into the engine rpm Ne value register 39. The clock pulse CP2 is supplied to the first address register 27 and the second address register 31, the clock pulse CP3 to the multiplier 35, and the clock pulse CP4 to the Ti value register 41, respectively. Further, the clock pulses CP2–8 are supplied to the EGR valve lift command value determining circuit 40.

Output signals from the intake pipe absolute pressure PB sensor 8, the atmospheric pressure PA sensor 16 and the EGR lift sensor 24 are converted into respective corresponding digital values by the A/D converter unit 29, and loaded into the PB value register 30, the PA value register 33, and the lift value register 25, respectively. A basic fuel injection period value Ti is read from the basic Ti value data memory 28 which corresponds to an address value read from the first address register 27 in accordance with detected values of intake pipe absolute pressure PB and engine rpm Ne stored in the PB value register 30 and the Ne value register 39.

Predetermined Ti values are stored in the basic Ti value data memory 28 in accordance with a map shown in FIG. 12, in which are provided predetermined Ti values previously experimentally determined as a function of intake pipe absolute pressure PB and engine rpm Ne as parameters. The numbers of predetermined PB and Ne values provided in the map may be set at respective suitable values for the capacity of the memory 28, etc. An interpolation method may be used for determining a Ti value if a detected PB or Ne value falls between adjacent predetermined PB or Ne values in the map.

As will be learned by comparing between the valve lift command value map in FIG. 9 and the Ti value map in FIG. 12, the predetermined PB values and the predetermined Ne values in the Ti value map are identical in part with those in the valve lift command value map, that is, the same predetermined PB and Ne values PB8–PBk and Ne8–Nel are provided in the maps of FIGS. 9 and 12. By setting the predetermined PB and Ne values in this manner, common addresses may be used for selecting part of the predetermined Ti values from the map of FIG. 12 and the predetermined LMAP values from the map of FIG. 9.

Addresses corresponding to the predetermined PB and Ne values in the map of FIG. 12 are stored in the first address register 27 in FIG. 10, while predetermined Ti values corresponding to these addresses are stored in the basic Ti value data memory 28.

The intake pipe absolute pressure PB signal from the PB value register 30 is converted into an integral value by the $\frac{1}{2}^l$ dividing circuit 26a and applied to the first input terminal 27a of the address register 27. The engine rpm NE value signal from the NE value register 39 is converted into an integral value by the $\frac{1}{2}^n$ dividing circuit 26c and applied to the other input terminal 27b of the first address register 27. An address value corresponding to these inputted intake pipe absolute pressure PB and engine rpm Ne is read from the first address register 27 upon application of each clock pulse CP2 thereto. The read address value is supplied to the basic Ti value data memory 28, where a basic fuel injection period Ti value is read which corresponds to the input address value. The read Ti value is applied to the input terminal 35a of the multiplier 35 as an input M1.

Addresses are stored in the second address register 31 in FIG. 10, which individually correspond to the predetermined PA and PB values in the map of FIG. 13.

At the KPA data memory 34 is read a predetermined value of correction coefficient KPA which corresponds to an address value read from the second address register 31 in accordance with input values of atmospheric pressure PA and intake pipe absolute pressure PB. The predetermined values KPAij stored in the memory 34 are previously determined by using the aforegiven equation (20). The predetermined values KPAij are stored in the KPA value data memory 34 in accordance with a map shown in FIG. 13, in which these predetermined values KPAij are provided with atmospheric pressure PA and intakepipe absolute pressure PB as parameters. The numbers of the predetermined PA and PB values are set at respective suitable values for the capacity of the memory 34, etc. In the map of FIG. 13, these numbers are both eight. An interpolation method may be used for determining the KPA value if a detected PA or PB value falls between adjacent PA or PB values, if necessary.

The intake pipe absolute pressure PB value in the form of an integral value from the $\frac{1}{2}^l$ dividing circuit 26a is supplied to the second address register 31 at its input terminal 31a, and the atmospheric pressure PA value in the form of an integral value from the $\frac{1}{2}^m$ dividing circuit 26b to the same register at its other input terminal 31b, respectively. An address value corresponding to these input PB and PA values is read from the second address register 31, upon application of each clock pulse CP2 thereto, and the read address value is supplied to the KPA value data memory 34. A value of the correction coefficient KPA corresponding to the input address value is read from the KPA value data memory 34, and the read KPA value is applied to the input terminal of the multiplier 35 as an input N1.

The multiplier 35 carries out a multiplication of the input M1 by the input N1 upon application of each clock pulse CP3 thereto, and the resultant product M1·N1 or atmospheric pressure-corrected basic Ti value KPA·Ti is supplied through the output terminal 35c to the Ti value register 41. Upon application of each clock pulse CP4 to the Ti value register 41, the above atmospheric pressure-corrected Ti value KPA·Ti is loaded into the same register 41, and simultaneously supplied to the Ti value control circuit 43. The Ti value control circuit 43 operates on the input Ti value to drive the injector or injectors 6a of the fuel injection device 6 to open for a period of time corresponding to the input Ti value.

The EGR lift command value determining circuit 40 is supplied with the intake pipe absolute pressure PB value signal in the form of an integral value from the $\frac{1}{2}^l$ dividing circuit 26a, the engine rpm Ne value signal also in the form of an integral value from the $\frac{1}{2}^n$ dividing circuit 26c, and the atmospheric pressure PA value signal from the PA value register 33, to selectively read a valve lift command value LMAP corresponding to the input signals PB and NE, from one of the lift command value maps of FIG. 9 which corresponds to the input atmospheric pressure PA value. The read lift command value LAMP is supplied to the EGR control valve control circuit 42. The above read value LMAP is an appropriate value for actual atmospheric pressure PA, that is a substantially atmospheric pressure-corrected value.

An actual valve opening or lift signal LACT from the EGR lift sensor 24 mounted on the exhaust gas recirculation valve 19 in FIG. 5 is converted into a correspondin digital signal by the A/D converter unit 29, and the digital signal is loaded into the lift value register 25. The actual valve opening signal LACT is simultaneously transferred from the register 25 to the EGR control valve control circuit 42. The control circuit 42 operates on the input signal LACT to determine the difference between the actual valve opening value LACT and the aforementioned atmospheric pressure-corrected lift command value LMAP, and actuates both or one of the EGR control valves 21 and 22 in accordance with the absolute value of the differential value and the relative value of same to zero to regulate the pressure in the negative pressure chamber 19d of the exhaust gas recirculation valve 19 so as to make the above differential value zero. In the above stated manner, according to the invention, the exhaust gas recirculating quantity is controlled so as to maintain the exhaust gas recirculating rate at a constant value irrespective of changes in the atmospheric pressure.

Figure 14A:
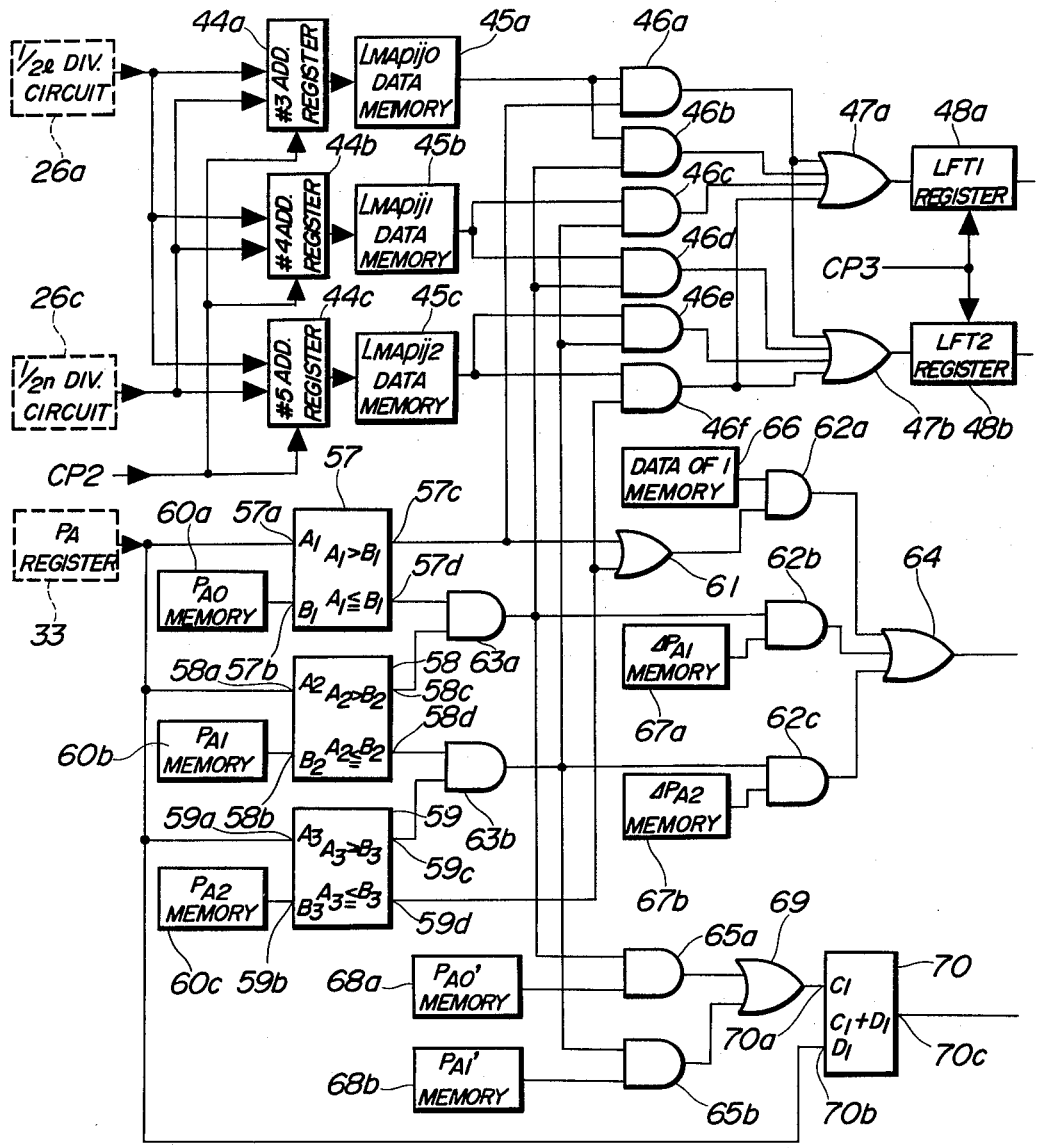
FIG. 14 is a circuit diagram illustrating the interior construction of the EGR lift command value determining circuit in FIG. 10, according to another embodiment of the invention.
Figure 14:
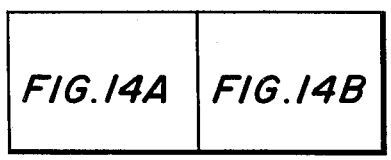
Figure 14B:
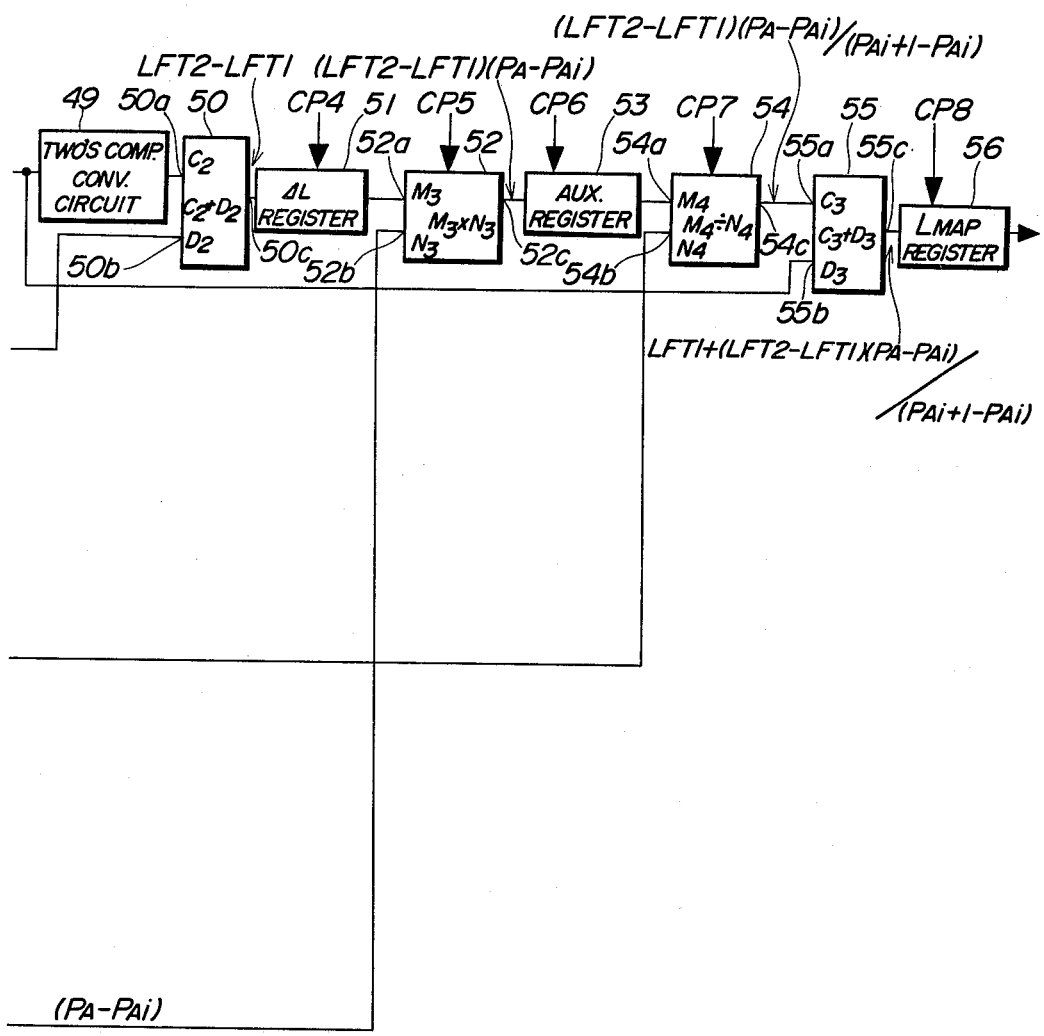

FIG. 14 illustrates the interior construction of the EGR lift command value determining circuit 40 in FIG. 10, according to another embodiment of the invention. The circuit of FIG. 14 is adapted to determine the lift command value LMAP on the basis of the lift command value maps of FIG. 9, normally by means of interpolation dependent upon atmospheric pressure PA. In the example of FIG. 14 are used only three maps for simplification of the illustration and description. The $\frac{1}{2}^l$ dividing circuit 26a and the $\frac{1}{2}^n$ dividing circuit 26c, both appearing in FIG. 10 have their outputs connected to the inputs of a third address register 44a through a fifth address register 44c, which in turn have their outputs connected, respectively, to an LMAPij0 value data memory 45a-an LMAPij2 value value data memory 45c, at their inputs. The LMAPij0 value data memory 45a has its output connected to one input terminals of AND circuits 46a and 46b, the LMAPij1 value data memory 45b to one input terminals of AND circuits 46c and 46d, and the LMAPij2 value data memory 46c to one input terminals of AND circuits 45e and 45f, respectively. The AND circuits 46a–46c and 46f have their outputs connected to the input of an OR circuit 47a, and the AND circuits 46a and 46d–46f have their outputs connected to the input of another OR circuit 47b. The OR circuit 47a has its output connected to a two's complement converting circuit 49 and one input terminal 55b of an adder 55, both by way of an LFT1 value register 48a, while the OR circuit 47b has its output connected to an input terminal 50b of an adder 50 by way of an LFT2 value register 48b. The two's complement converting circuit 49 has its output connected to the other input terminal 50a of the adder 50. The adder 50 in turn has its output terminal 50c connected to an input terminal 52a of a multiplier 52 by way of a ΔL value register 51. The multiplier 52 has its output terminal 52c connected to an input terminal 54a of a divider 54 by way of an auxiliary register 53, which in turn has its output terminal 54c connected to the other input terminal 55a of the adder 55. The adder 55 has its output terminal 55c connected to the input of an LMAP value register 56 which in turn has its output connected to the EGR control valve control circuit 42 in FIG. 10.

The PA value register 33 in FIG. 10 is connected to input terminals 57a-59a of comparators 57-59 as well as an input terminal 70b of an adder 70. A PA0 value memory 60a-PA2 value memory 60c are connected to the other input terminals 57b-59b of the respective comparators 57-59. The comparator 57 has its output terminal 57c, connected to the other input terminal of the AND circuit 46a as well as the input of an OR circuit 61, and its output terminal 57d to one input terminal of an AND circuit 63a, respectively. The comparator 58 has its output terminal 58c connected to the other input terminal of the AND circuit 63a and its other output terminal 58d of an input terminal of an AND circuit 63b, respectively. The comparator 59 has its output terminal 59c connected to the other input terminal of the AND circuit 63b and its other output terminal 59d to the input of the OR circuit 61, as well as the other input terminal of the AND circuit 46f, respectively. The OR circuit 61 has its output connected to the input of an OR circuit 64 by way of an AND circuit 62a, while the AND circuit 63a has its output connected to the inputs of AND circuits 46b, 46d, 62b and 65a. The AND circuit 63b has its output connected to the inputs of AND circuit 46c, 46e, 62c and 65b. The AND circuits 62b and 62c have their outputs connected to the input of the OR circuit 64 which in turn has its output connected to the input terminal 54b of the aforementioned divider 54. The AND circuit 62a has its other input terminal connected to a 1 value data memory 66, and the AND circuits 62b and 62c have their other inputs terminals connected, respectively, to a ΔPA1 value memory 67a and a ΔPA2 value memory 67b. The AND circuits 65a and 65b have their other input terminals connected, respectively, to a PA0' value memory 68a and a PA1' value memory 68b, and their output terminals to the other input terminal 70a of the adder 70 by way of an OR circuit 69, respectively. The adder 70 has its output terminal 70c connected to the other input terminal 52b of the aforementioned multiplier 52.

The EGR lift command value determining circuit 40 constructed above operates as follows: The third, fourth and fifth address registers 44a–44c each store a set of address values for selection of values LMAPij corresponding to intake pipe absolute pressure PB and engine rpm Ne. The three sets of address values are applicable, respectively, when the atmospheric pressure PA has values PA0, PA1 and PA2 (PA2 < PA1 < PA0). The LMAPij0 value data memory 45a through the LMAPij2 value data memory 45c store three sets of predetermined values LMAPij corresponding to respective sets of address values. Three sets of predetermined values LMAPij are stored in the memories 45a–45c in accordance with their respective different maps shown in FIG. 9 in which they are provided with intake pipe absolute pressure PB and engine rpm Ne as parameters, and which are divided according to the above different values PA0, PA1 and PA2 of atmospheric pressure PA. An intake pipe absolute pressure PB signal in the form of an integral value outputted from the $\frac{1}{2}^l$ dividing circuit 26a in FIG. 10 and an engine rpm NE signal in the form of an integral value outputted from the $\frac{1}{2}^n$ dividing circuit 26b in FIG. 10 are supplied to the third, fourth and fifth address registers 44a–44c. Upon application of each clock pulse CP2 to the registers, address values are read from these registers, which correspond to the PB and NE values inputted thereto, and the read address values are applied to respective ones of the LMAPij0 value data memory 45a through the LMAPij2 value data memory 45c. From these data memories 45a–45c, values LMAPij are read, which correspond to the input address values, and supplied to the respective AND circuits 46a–46f.

On the other hand, an atmospheric pressure PA signal from the PA value register 33 in FIG. 10 is supplied to the comparators 57-59 at their input terminals 57a-59a, as inputs A1-A3. The comparators 57-59 have their other input terminals 57b-59b supplied, respectively, with predetermined reference atmospheric pressure values PA0, PA1 and PA2 from the PA0 value memory 60a, the PA1 value memory 60b, and the PA2 value memory 60c, as inputs B1-B3.

Let is now be assumed that the atmospheric pressure PA is in the relationship of PA1 ≤ PA < PA0. Then, the input relationship of A1 ≤ B1 or PA ≤ PA0 stands at the comparator 57. An output of 0 is then generated at the output terminal 57c of the comparator 57 and supplied to the AND circuit 46a, directly and also to the AND circuit 62a through the OR circuit 61, and simultaneously an output of 1 is generated at the other output terminal 57d and supplied to the AND circuit 63a. At the same time, the comparator 58 has the input relationship of A2>B2 or PA1<PA so that an output of 1 is supplied through the output terminal 58c to the AND circuit 63a, and an output of 0 through the other output terminal 58d to the AND circuit 63b, respectively. At the comparator 59, the input relationship of A3>B3 or PA2<PA stands so that an output of 1 is supplied through the output terminal 59c to the AND circuit 63b, and an output of 0 through the other output terminal 59d to the AND circuit 46f, directly and also to the AND circuit 62a through the OR circuit 61, respectively. Having its two input terminals both supplied with outputs of 1, the AND circuit 63a generates an output of 1 and applies same to the AND circuits 46b, 46d, 62b and 65a. On the other hand, the AND circuit 63b, which is supplied with the output of 0 from the output terminal 58d of the comparator 58, generates an output of 0 and applies same to the AND circuits 46c, 46e, 62c and 65b. As stated above, of the AND circuits 46a–46f, only the AND circuits 46b and 46d are opened on this occasion. Consequently, a value LMAPij0 selected from a map corresponding to the atmospheric pressure value PA0 is delivered from the LMAPij0 value data memory 45a to the LFT1 value register 48a through the AND circuit 46b and the OR circuit 47a. A value LMAPij1 seleted from another map corresponding to the atmospheric pressure value PA1 is supplied to the LFT2 value register 48b through the AND circuit 46d and the OR circuit 47b. The above value LMAPij0 delivered to the LFT1 value register 48a is loaded as a value LFT1 into the same register 48a upon application of each clock pulse CP3 thereto, and simultaneously the newly loded value LFT1 is applied to the two's complement converting circuit 49 as well as to the input terminal 55b of the adder 55 as an input D3. On the other hand, the LFT1 value supplied to the two's complement converting circuit 49 is converted into a negative value and then applied to the input terminal 50a of the adder 50 as an input C2. On the other hand, the value LMAPij1 supplied to the LFT2 value register 48b is loaded as a value LFT2 into the same register upon application of each clock pulse CP3 thereto, and simultaneously the newly loaded value LFT2 is applied to the other input terminal 50b of the above adder 50 as an input D2. At the adder 50, an addition of the input C2 and the input D2 is carried out, that is, in fact, a subtraction of the value LFT1 from the value LFT2 is carried out, and the resultant difference ΔL is applied to the ΔL value register 51 and loaded into the same register upon application of each clock pulse CP4 thereto, and simultaneously the newly loaded value ΔL is applied to the input terminal 52a of the multiplier 52 as an input M3.

PA0′ value memory 68a stores a value of the two's complement of the reference or standard atmospheric pressure value PA0, which is supplied to the AND circuit 65a. The PA1′ value memory 68b stores a value of the two's complement of the reference atmospheric pressure value PA1, which is supplied to the AND circuit 65b. Since on this occasion the output of 1 from the AND circuit 63a is supplied to the AND circuit 65a, *the latter is opened to allow the two's complement value of the value PA0 from the PA0′ value memory 68a to be* applied as an input C1 to the input termianl 70a of the adder 70 through the AND circuit 65a and the OR circuit 69. On the other hand, the adder 70 then has its other input terminal 70b supplied with an atmospheric pressure PA value from the PA value register 33, as an input D1, and the resultant sum C1+D1 or PA−PAi is supplied through the output terminal 70c of the adder 70 to the input terminal 52b of the multiplier 52, as an input N3. Upon application of each clock pulse CP5 to the multiplier 52, it carries out a multiplication of the input M3 by the input N3, and supplies the resultant product M3·N3 or (LFT2−LFT1)·(PA−PAi) to the auxiliary register 53. The above product M3·N3 is loaded into the auxiliary register 53 in synchronism with application of each clock pulse CP6 thereto, and simultaneously the newly loaded value is applied to the input terminal 54a of the divider 54 as an input M4.

The ΔPA1 value memory 67a stores a value (PA1−PA0) and supplies it to the AND circuit 62b, while the ΔPA2 value memory 67b stores a value (PA2−PA1) and supplies it to the AND circuit 62c. Since on this occasion the AND circuit 62b is opened by the output of 1 from the AND circuit 63a, the stored value in the ΔPA1 value memory 67a is supplied to the divider 54 at its other input terminal 54b through the AND circuit 62b and the OR circuit 64, as an input N4. The divider 54 carries out a division of the input M4 by the input N4 in synchronism with application of each clock pulse CP7 thereto, and supplies the resultant quotient M4/N4 or (LFT2−LFT1)·(PA−PAi)/(PAi+1−PAi) to the adder 55 at its input terminal 55a, as an input C3. The adder 55 carries out an addition of the input C3 and the input D3, and supplies the resultant sum C3+D3 or LFT1+[(LFT2−LFT1)/(PAi+1−PAi)]·(PA−PAi) to the LMAP value register 56. The sum value is loaded into the register 56 in synchronism with application of each clock pulse CP8 thereto, and simultaneously the newly loaded value is applied to the EGR control valve control circuit 42 in FIG. 10.

Although the above described operation is based upon the assumption that the atmospheric pressure PA is in the relationship of PA1<PA<PA2, a similar operation to the above is carried out also when the relationship of PA2<PA<PA1 stands.

When the atmospheric pressure PA is larger than the reference value PA0 or smaller than the reference value PA2, the LFT1 value register 48a and the LFT2 value register 48b have the same value LMAPij0 or LMAPij2 stored therein, so that the sum obtained by the adder 50 is zero. That is, when the atmospheric pressure PA is larger than PA0 or smaller than PA2, the interpolation is not carried out, but a selected predetermined value LMAPij0 or LMAPij2 in a map is directly supplied to the EGR control valve control circuit 42 in FIG. 10.

As described above, according to the example of FIG. 14, two predetermined lift command values LMAPij are read from two of the third, fourth and fifth address registers 44a–44c and LMAPij0-2 data memories 45a–45c, and thereafter an interpolation is carried out on the basis of actual atmospheric pressure PA and the above read two predetermined lift command values LMAPij to obtain a suitable lift command value. However, alternatively of the above method, three or more lift command values are previously determined by means of interpolation, using the maps of FIG. 9 on the basis of actual PB and/or Ne value, and thereafter a further interpolation is carried out on the basis of actual atmospheric pressure PA and two of the previously determined three or more lift command values to obtain a final lift command value, which is more accurate than the above method, in a manner similar to that described above with reference to FIG. 14.

FIG. 15 illustrates another embodiment of the EGR lift command value determining circuit 40, which is adapted to carry out the alternative determining method just mentioned above. In FIG. 15, elements having identical functions with those in FIG. 14 are designated by identical reference numerals. Illustration of other portions of the circuit of FIG. 15 than those illustrated is omitted for the sake of simplification of the illustration and description, since they are substantially identical in construction and function with those corresponding portions of the circuit of FIG. 14.

The PB value register 30 and the NE value register 39 are each connected to the inputs of an LMAPij0 interpolating circuit 80a through an LMAPij2 interpolating circuit 80c which in turn have their outputs connected to an LMAP0' value register 81a through an LMAP2' value register 81c, respectively. The LMAP0' value register 81a has its output connected to one input terminals of AND circuits 46a and 46b, the LMAP1' value register 81b has its output connected to one input terminals of AND circuits 46c and 46d, and the LMAP2' value register 81c has its output connected to one input terminals of AND circuits 46e and 46f.

The LMAPij0 interpolating circuit 80a is adapted to arithmetically calculate a lift command value LMAPij0 from predetermined values in the lift command value map LMAPij0 in FIG. 9, which is applicable when the atmospheric pressure PA has a value PA0. More specifically, a plurality of, e.g. two predetermined lift command values are read from a data memory, not shown, which corresponds to an intake pipe absolute pressure PB value from the PB value register 30 and an engine rpm NE value from the NE value register 39, and then the interpolating circuit 80a arithmetically calculates a desired lift command value LMAP0' on the basis of the above read predetermined lift command values and the actual intake pipe absolute pressure PB value and/or the actual engine rpm NE value, by means of an interpolating method similar to that previously described with reference to FIG. 14. The lift command value LMAP0' thus obtained by interpolation is supplied to the AND circuits 46a and 46b through the LMAP0' value register 81a.

In the same manner as above, also the LMAPij1 interpolating circuit 80b and the LMAPij2 interpolating circuit 80c operate to determine by interpolation lift command values LMAP1' and LMAP2' on the basis of predetermined values read from the lift command value maps LMAPij1 and LMAPij2 in FIG. 9, applicable when the atmospheric pressure PA has a value PA1 and a value PA2, respectively, as well as an actual intake pipe absolute pressure PB value and/or an actual engine rpm NE value, and supply these determined values LMAP1' and LMAP2' to the AND circuits 46c through 46f.

A further interpolation is carried out on the basis of the lift command values LMAP0' through LMAP2' supplied to the AND circuits 46a through 46f, in the same manner as that in FIG. 14, and the resultant lift command value LMAP, which is a value interpolated by intake pipe absolute pressure PB and/or engine rpm NE in addition to atmospheric pressure PA, is supplied to the EGR control valve control circuit in FIG. 10.

What is claimed is:

1. In an electronic fuel injection control system for use with an internal combustion engine of the type having an intake passage, an exhaust passage, a throttle valve arranged in said intake passage, and at least one fuel injection valve disposed to inject fuel being supplied to said engine, a valve opening period of which determines the fuel injection quantity, the combination comprising: a first sensor for detecting a value of engine rpm; a second sensor for detecting a value of absolute pressure in said intake passage of said engine at a location downstream of said throttle valve; a third sensor for detecting a value of ambient atmospheric absolute pressure; an exhaust gas recirculation passage communiating said exhaust passage of said engine with said intake passage of same at a location downstream of said throttle valve; an exhaust gas recirculation valve arranged across said exhaust gas recirculation passage; valve opening command means for determining a desired value of the valve opening of said exhaust gas recirculation valve and generating a command singal indicative of the determined valve opening value, said valve opening command means including first memory means storing a plurality of different sets of predetermined valve opening command values previously determined as a function of variables of engine rpm, absolute pressure in said intake passage and atmospheric absolute pressure, said different sets individually corresponding to predetermined different values of one of said variables, said predetermined valve opening command values in each of said different sets being functions of the other two variables, and means responsive to output signals from said first sensor, said second sensor and said third sensor to selectively read at last one predetermined valve opening command value corresponding to said output signals from at least one corresponding set of said different sets of predetermined valve opening command values; means responsive to said command signal indicative of the read predetermined valve opening command value to control the valve opening of said exhaust gas recirculation valve; whereby a quantity of exhaust gases being recirculated through said exhaust gas recirculation passage is maintained at a constant value with respect to a total intake air quantity being supplied to said engine through said intake passage, irrespective of changes in the ambient atmospheric pressure; means for determining a desired value of a basic valve opening period for said fuel injection valve and generating a first signal indicative of the determining desired valve opening period value, said basic valve opening period determining means including second memory means storing a plurality of predetermined basic valve opening period values being functions of engine rpm and absolute pressure insaid intake passage, and means responsive to output signals from said first sensor and said second sensor to selectively read as a value of said first signal a desired predetermined basic valve opening period value from said second memory means, corresponding to said output signals; means responsive to output signals from said second sensor and said third sensor to correct the value of said first signal and generating a second signal indicative of the corrected valve opening period value; and means responsive to said second signal to drive said fuel injection valve to open for a period of time corresponding to said second signal.

2. The electronic fuel injection control system as claimed in claim 1, wherein said different sets of predetermined valve opening command values stored in said first memory means individually correspond to a plurality of different predetermined values of atmospheric absolute pressure, and said predetermined valve opening command values in each of said different sets are functions of engine rpm and absolute pressure in said intake passage.

3. The electronic fuel injection control system as claimed in claim 1, including means storing a plurality of addresses corresponding to said predetermined basic valve opening period values being functions of engine rpm and absolute pressure in said intake passage for said fuel injection valve, and wherein at least part of said addresses are identical with addresses corresponding to said predetermined valve opening command values for said exhaust gas recirculation valve.

4. In an electronic fuel injection control system for use with an internal combustion engine of the type having an intake passage, an exhaust passage, a throttle valve arranged in said intake passage, and at least one fuel injection valve disposed to inject fuel being supplied to said engine, a valve opening period of which determines the fuel injection quantity, the combination comprising: a first sensor for detecting a value of engine rpm; a second sensor for detecting a value of absolute pressure in said intake passage of said engine at a location downstream of said throttle valve; a third sensor for detecting a value of ambient atmospheric absolute pressure; an exhaust gas recirculation passage communicating said exhaust passage of said engine with said intake passage of same at a location downstream of said throttle valve; an exhaust gas recirculation valve arranged across said exhaust gas recirculation passage; valve opening command means for determining a desired value of the valve opening of said exhaust gas recirculation valve and generating a command signal indicative of the determined valve opening value, said valve opening command means including first memory means storing a plurality of different sets of predetermined valve opening command values previously determined as a function of variables of engine rpm, absolute pressure in said intake passage and atmospheric absolute pressure, said different sets individually corresponding to predetermined different values of one of said variables, said predetermined valve opening command values in each of said different sets being functions of the other two variables, means responsive to output signals from said first sensor, said second sensor and said third sensor to selectively read at least two predetermined valve opening command values corresponding to said output signals from at least two corresponding sets of said different sets of predetermined valve opening command values, and means for determining a desired valve opening command value from said read predetermined valve opening command values and a detected value of said one variable, by means of interpolation; means responsive to said command signal indicative of said determined desired valve opening command value to control the valve opening of said exhaust gas recirculation valve; whereby a quantity of exhaust gases being recirculated through said exhaust gas recirculation passage is maintained at a constant value with respect to a total intake air quantity being supplied to said engine through said intake passage, irrespective of changes in the ambient atmospheric pressure; means for determining a desired value of a basic valve opening period for said fuel injection valve and generating a first signal indicative of the determined desired valve opening period value, said basic valve opening period determining means including second memory means storing a plurality of predetermined basic valve opening period values being functions of engine rpm and absolute pressure in said intake passage, and means responsive to output signals from said first sensor and said second sensor to selectively read as a value of said first signal a desired predetermined basic valve opening period value from said second memory means, corresponding to said output signals; means responsive to output signals from said second sensor and said third sensor to correct the value of said first signal and generating a second signal indicative of the corrected valve opening period value; and means responsive to said second signal to drive said fuel injection valve to open for a period of time corresponding to said second signal.

5. The electronic fuel injection control system as claimed in claim 4, wherein said valve opening command means comprises: memory means as said first memory means storing a plurality of different sets of predetermined valve opening command values, which are previously determined as a function of absolute pressure in said intake passage and engine rpm, said different sets individually corresponding to a plurality of different predetermined values of atmospheric absolute pressure; selector means operable as said reading means to select two adjacent sets from said different sets of predetermined valve opening command values, which correspond to two adjacent ones of said different predetermined atmospheric absolute pressure, between which a detetcted value of atmospheric absolute pressure falls, and select two predetermined valve opening command values from said selected two adjacent sets, which correspond to detected values of engine rpm and absolute pressure in said intake passage, and means for arithmetically calculating a desired valve opening command value by means of a diference between said selected two predetermined valve opening command values, a difference between said selected two adjacent predetermined atmospheric absolute pressure values, and a difference between one of said selected two adjacent predetermined atmospheric absolute pressure values and said detected atmospheric absolute pressure value.

6. The electronic fuel injection control system as claimed in claim 5, wherein when a detected value of atmospheric absolute pressure is larger than a maximum value of said predetermined atmospheric absolute pressure values or smaller than a minimum value thereof, said arithmetically calculating means is operable to select one set from said different sets of predetermined valve opening command values, which corresponds to said maximum value of said predetermined atmospheric absolute pressure values or said minimum value thereof, select one predetermined valve opening command value from said selected one set, which corresponds to detected values of engine rpm and absolute pressure in said intake passage, and directly generate said command signal indicative of said selected one predetermined valve opening command value.

7. In an electronic fuel injection control system for use with an internal combustion engine of the type having an intake passage, an exhaust passage, throttle valve arranged in said intake passage, and at least one fuel injection valve disposed to inject fuel being supplied to said engine, a valve opening period of which determines the fuel injection quantity, the combination comprising: a first sensor for detecting a value of engine rpm; a second sensor for detecting a value of absolute pressure in said intake passage of said engine at a location downstream of said throttle valve; a third sensor for detecting a value of ambient atmospheric absolute pressure; an exhaust gas recirculation passage communicating said exhaust passage of said engine with said intake passage of same at a location downstream of said throttle valve; an exhaust gas recirculation valve arranged across said exhaust gas recirculation passage; valve opening command means for determining a desired value of the valve opening of said exhaust gas recirculation valve and generating a command signal indicative of the determined valve opening value, said valve opening command means including first memory means storing a plurality of different sets of predetermined valve opening command values previously determined as a function of engine rpm, absolute pressure in said intake passage and atmospheric absolute pressure, said different sets individually corresponding to predetermined different values of atmospheric absolute pressure, said predetermined valve opening command values in each of said different sets being functions of engine rpm and absolute pressure in said intake passage, means responsive to output signals from said first sensor, said second sensor and said third sensor to selectively read a plurality of predetermined valve opening command values corresponding to said output signals from a plurality of corresponding sets of said different sets of predetermined valve opening command values, first interpolating means for determining a plurality of first valve opening command values from said read predetermined valve opening command values and at least one of values of engine rpm and absolute pressure in said intake passage detected, respectively, by said first sensor and said second sensor, by means of interpolation, and second interpolating means for determining a second valve opening command value from said determined first valve opening command values and a value of atmospheric absolute pressure detected by said third sensor, by means of interpolation; means responsive to said command signal indicative of said determined second valve opening command value to conrol the valve opening of said exhaust gas recirculation valve; whereby a quantity of exhaust gases being recirculated through said exhaust gas recirculation passage is maintained at a constant value with respect to a total intake air quantity being supplied to said engine through said intake passage, irrespective of changes in the ambient atmospheric pressure; means for determining a desired value of a basic valve opening period for said fuel injection valve and generating a first signal indicative of the determined desired valve opening period value, said basic valve opening period determining means including second memory means storing a plurality of predetermined basic valve opening period values being functions of engine rpm and absolute pressure in said intake passage, and means responsive to output signals from said first sensor and said second sensor to selectively read as a value of said first signal a desired predetermined basic valve opening period value from said second memory means, corresponding to said output signals; means responsive to output signals from said second sensor and said third sensor to correct the value of said first signal and generating a second signal indicative of the corrected valve opening period value; and means responsive to said second signal to drive said fuel injection valve to open for a period of time corresponding to said second signal.

* * * * *